US012789885B2

(12) United States Patent
Wilson-Jones et al.

(10) Patent No.: US 12,789,885 B2
(45) Date of Patent: Nov. 10, 2026

(54) STEERING ASSEMBLY FOR A VEHICLE

(71) Applicant: ZF Automotive UK Limited, Solihull (GB)

(72) Inventors: Russell Wilson-Jones, Stratford upon Avon (GB); Mark Anthony Wilkes, Kings Norton (GB)

(73) Assignee: ZF Automotive UK Limited, Solihull (GB)

( * ) Notice: Subject to any disclaimer, the term of this patent is extended or adjusted under 35 U.S.C. 154(b) by 0 days.

(21) Appl. No.: 18/441,593

(22) Filed: Feb. 14, 2024

(65) Prior Publication Data

US 2024/0270302 A1 Aug. 15, 2024

(30) Foreign Application Priority Data

Feb. 14, 2023 (GB) .................................... 2302113

(51) Int. Cl.
*B62D 5/00* (2006.01)
*B62D 5/04* (2006.01)

(52) U.S. Cl.
CPC ............ *B62D 5/005* (2013.01); *B62D 5/043* (2013.01)

(58) Field of Classification Search
CPC ........ B62D 5/005; B62D 5/043; B62D 5/006; B62D 5/001; B62D 5/04; F16F 9/12; F16F 9/145
USPC .......................................................... 701/42
See application file for complete search history.

(56) References Cited

U.S. PATENT DOCUMENTS

| | | | |
|---|---|---|---|
| 4,503,952 | A | 3/1985 | Hesse |
| 2022/0037947 | A1 | 2/2022 | Takahashi |

FOREIGN PATENT DOCUMENTS

| | | | |
|---|---|---|---|
| KR | 102375489 | * | 3/2022 |
| KR | 102375489 | B1 | 3/2022 |
| WO | 2022081946 | A1 | 4/2022 |

* cited by examiner

*Primary Examiner* — Maceeh Anwari
(74) *Attorney, Agent, or Firm* — Kristin L. Murphy

(57) ABSTRACT

A steering assembly for a steer-by-wire vehicle comprises a rotatably mounted elongate steering column configured for attachment of a steering member at one end, the steering column being rotatable about its longitudinal axis in either direction from a straight-ahead position. The steering assembly further comprises a damper having a housing defining a volume for receipt of a damping fluid; a stator within the housing and rotatably fixed relative to the housing; and a rotor within the housing, the rotor being coupled with the steering column and rotatable therewith. Each of the stator and rotor comprises a shear surface, the shear surfaces of the stator and the rotor being positioned adjacent one another to generate a resistance to rotation of the rotor when the housing contains damping fluid; and the total surface area of the shear surfaces of the stator and the rotor positioned adjacent one another which generates the resistance to rotation of the rotor varies as the steering column is rotated from the straight-ahead position.

30 Claims, 14 Drawing Sheets

STEERING ASSEMBLY FOR A VEHICLE

CROSS-REFERENCE TO RELATED APPLICATION

This application claims priority to GB Priority Application No. 2302113.2, filed Feb. 14, 2023, the disclosure of which is incorporated herein by reference in its entirety.

TECHNICAL FIELD

This disclosure relates to steering assemblies for vehicles and to motor vehicles comprising such steering assemblies. More specifically, although not exclusively, this disclosure relates to steering assemblies for use in steer-by-wire vehicles.

BACKGROUND

Traditional vehicle steering systems utilise a constant mechanical connection between the steering wheel and the steered wheels. However, the trend towards steer-by-wire steering systems breaks the traditional mechanical connection and replaces it with a digital control signal. Specifically, a steering input is applied through a steering wheel. A signal is transmitted to a steering axle actuator in dependence on the steering input, controlling motion of the steering rack and the degree to which the steered wheels are pivoted. Due to the absence of a mechanical connection between the steering wheel and steering rack, it is often desired to provide a feedback torque to the steering wheel in the opposite direction to the steering input, in order to provide a sensation of road feel to the driver.

One way in which feedback can be achieved is via a damper, e.g. a viscous damper, which may provide a simple, passive arrangement of generating a feedback torque. This may be provided either alone, or in addition to a torque feedback motor. However, it has been found that prior art passive dampers provide a substantially constant feedback torque throughout the range of rotation of the steering wheel, which does not necessarily accurately represent the feedback experienced from a mechanical connection. Therefore, there is a desire to provide an improved feedback torque profile, utilising a passive arrangement, whereby the feedback torque is dependent on the angle of rotation of the steering wheel.

SUMMARY

It has been found that the aforementioned issues may be overcome by providing a damper in which a total surface area subject to viscous coupling by damping fluid is varied with the angle of rotation of the steering wheel.

In accordance with the present disclosure, a steering assembly for a steer-by-wire vehicle comprises:

a rotatably mounted elongate steering column configured for attachment of a steering member at one end, the steering column being rotatable about its longitudinal axis in either direction from a straight ahead position;

a damper comprising:

a housing defining a volume for receipt of a damping fluid;

a stator within the housing and rotatably fixed relative to the housing; and a rotor within the housing, the rotor being coupled with the steering column and rotatable therewith;

wherein each of the stator and rotor comprises a shear surface, the shear surfaces of the stator and the rotor being positioned adjacent one another to generate a resistance to rotation of the rotor when the housing contains damping fluid; and the total surface area of the shear surfaces of the stator and the rotor positioned adjacent one another which generates the resistance to rotation of the rotor varies as the steering column is rotated from a straight ahead position.

The variation in the total area of shear surfaces of the rotor and the stator positioned adjacent one another provides a variation in the resistance to rotation of the rotor. As the rotor is rotated with the steering shaft, the damping fluid located between the adjacent shear surfaces is sheared, and a drag force is applied to the rotor.

Therefore, by varying the total area of adjacent shear surfaces with rotation of the rotor, the amount of drag on the rotor, and therefore feedback torque, can also be varied with rotation of the rotor. As such, an improved feedback torque profile can be achieved.

In an exemplary arrangement, the total surface area of the shear surfaces of the stator and the rotor positioned adjacent one another is increased as the steering column is rotated from the straight ahead position.

In an exemplary arrangement, the total surface area of the shear surfaces of the stator and the rotor positioned adjacent one another is decreased as the steering column is rotated from the straight ahead position.

The straight ahead position may be or comprise a zero turn position, zero degree of rotation position, first position or a neutral position.

The stator and rotor may each comprise a respective elongate projection extending therefrom. Each elongate projection may comprise the respective shear surface. The respective elongate projection may be formed integrally with the rotor and/or stator.

The or each elongate projection may comprise a vane or rib.

The elongate projections may extend from the rotor and/or stator in the direction of the longitudinal axis of the steering column. The elongate projections may extend perpendicularly from the rotor and/or stator.

Each elongate projection may be arcuate or part-annular. At least one shear surface of each elongate projection may comprise a part-annular shear surface.

At least one shear surface of each elongate projection may be provided on a radially inner and/or radially outer sidewall thereof.

The total area of part-annular shear surfaces positioned adjacent one another may be increased as the steering column is rotated from the straight ahead position.

Each elongate projection may comprise a shear surface on a lengthwise extending end face.

The stator and rotor may be configured such that the elongate projections overlap when viewed along the longitudinal axis of the steering column, e.g. as the steering column is rotated from the straight ahead position. The amount by which the elongate projections overlap may be increased as the steering column is rotated from the straight ahead position.

The stator and rotor may comprise a plurality of radially spaced elongate projections and one or more passages described between adjacent elongate projections. An elongate projection of the rotor may be configured to be received within a passage of the stator and/or an elongate projection of the stator may be configured to be received within a passage of the rotor.

The, or each of the elongate projections of the stator and/or rotor may extend between a first and second ends, e.g. terminal ends. The first ends and/or second ends of the elongate projections of the stator and/or rotor may lie on a common radius.

The elongate projections of the stator and rotor may be arranged such that adjacent shear surfaces are spaced from one another.

The elongate projections of the stator may be parallel to one another and/or the elongate projections of the rotor may be parallel to one another.

The rotor and stator may be configured such that the extent to which the elongate projection of the rotor and/or the elongate projection of the stator are received within the respective passages is increased when the steering column is rotated from the straight-ahead position.

Each of the passages may have a width greater than a width of the elongate projection configured to be received therein such that adjacent shear surfaces are spaced from one another.

The height of an elongate projection of the rotor and/or stator may vary along its length. The height of an elongate projection may be the extent to which it extends from the stator or rotor.

The, or each elongate projection may be annular, having a high point of maximum height and low point of minimum height at diametrically opposite locations.

The stator and rotor may each comprise a respective annular elongate projection. Each annular elongate projection has a high point of maximum height and low point of minimum height at diametrically opposite locations and wherein the stator and rotor are configured such that the high point of the elongate projection of the stator is circumferentially aligned with the low point of the elongate projection of the rotor when the steering column is in a straight-ahead position.

The stator or rotor may comprise a pair of spaced annular elongate projection and an annular passage defined therebetween. The pair of spaced annular elongate may each have a circumferentially aligned high point of maximum height and a circumferentially aligned low point of minimum height at diametrically opposite locations. The annular elongate projection of other of the rotor and stator may be received within the passage One or each elongate projection may comprise a slot, interruption or opening to allow for the transfer of damping fluid thereacross.

The slot, interruption or opening may be arranged to distribute the flow of damping fluid between adjacent passages.

The shear surface of each of the stator and rotor may be planar and/or may extend radially with respect to the steering column.

The shear surface of the stator may be spaced from the shear surface of the rotor along the longitudinal axis of the steering column.

The shear surface of the stator may be axially spaced from the shear surface of the rotor.

The shear surfaces, e.g. the planar shear surfaces, may overlap when viewed along the longitudinal axis of the steering assembly.

One or each of the shear surfaces, e.g. the planar shear surfaces, is part-annular, arcuate or a truncated sector of a circle.

In exemplary arrangements, the shear surface of the rotor is annular and the shear surface of the stator is part-annular, arcuate or a truncated sector of a circle.

The stator and rotor may be configured such that the extent to which the shear surfaces overlap when viewed along the longitudinal axis of the steering assembly increases as the steering column is rotated from the straight ahead position.

In some exemplary arrangements, the rotor is mounted eccentrically, e.g. relative to the steering column and/or stator.

The stator and the rotor may be configured such that spacing between the shear surface of the elongate projection of the stator and the shear surface of the elongate projection of the rotor varies as the steering column is rotated from the straight ahead position.

The spacing may be reduced as the steering column is rotated from the straight ahead position.

The steering column may be configured to rotate a maximum of a half turn in either direction from the straight ahead position.

The steering column may be or comprise a steering shaft.

Adjacent shear surfaces may be positioned or located such that they are coupled via the damping fluid. The coupling may comprise viscous coupling.

Another aspect of the disclosure provides a steering assembly for a steer-by-wire vehicle, comprising:

a rotatably mounted elongate steering column configured for attachment of a steering member at one end, the steering column being rotatable about its longitudinal axis in either direction from a straight ahead position;

a damper comprising:

a housing defining a volume for receipt of a damping fluid;

a stator within the housing and rotatably fixed relative to the housing; and a rotor within the housing, the rotor being eccentrically coupled with the steering column and rotatable therewith;

wherein each of the stator and rotor comprises a shear surface, the shear surfaces of the stator and rotor being positioned adjacent to one another to generate a resistance to rotation of the rotor when the housing contains damping fluid; and that the spacing between the shear surfaces of the stator and rotor which generates resistance to rotation of the rotor varies as the steering column is rotated from the straight-ahead position.

The spacing between the shear surfaces of the stator and rotor which generates resistance to rotation of the rotor may be reduced as the steering column is rotated from the straight ahead position The steering assembly may comprise a motor configured to provide feedback torque to the steering member and/or steering column.

A further aspect of the disclosure provides a steering column assembly comprising a steering assembly as described above.

A further aspect of the disclosure provides a vehicle comprising a steering assembly as described above or a steering column assembly as described above.

For the avoidance of doubt, any of the features described herein apply equally to any aspect of the disclosure.

Another aspect of the disclosure provides a computer program element comprising and/or describing and/or defining a three-dimensional design for use with a simulation arrangement or a three-dimensional additive or subtractive manufacturing device, e.g. a three-dimensional printer or CNC machine, the three-dimensional design comprising an arrangement of the steering assembly described above.

Within the scope of this application it is expressly intended that the various aspects, arrangements, examples and alternatives set out in the preceding paragraphs, in the claims and/or in the following description and drawings, and in particular the individual features thereof, may be taken independently or in any combination. That is, all exemplary arrangements and/or features of any embodiment can be combined in any way and/or combination, unless such features are incompatible. For the avoidance of doubt, the terms “may”, “and/or”, “e.g.”, “for example” and any similar term as used herein should be interpreted as non-limiting such that any feature so-described need not be present. Indeed, any combination of optional features is expressly envisaged without departing from the scope of the disclosure, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Exemplary arrangements of the disclosure will now be described by way of example only with reference to the accompanying drawings in which.

DETAILED DESCRIPTION

Figure 1:
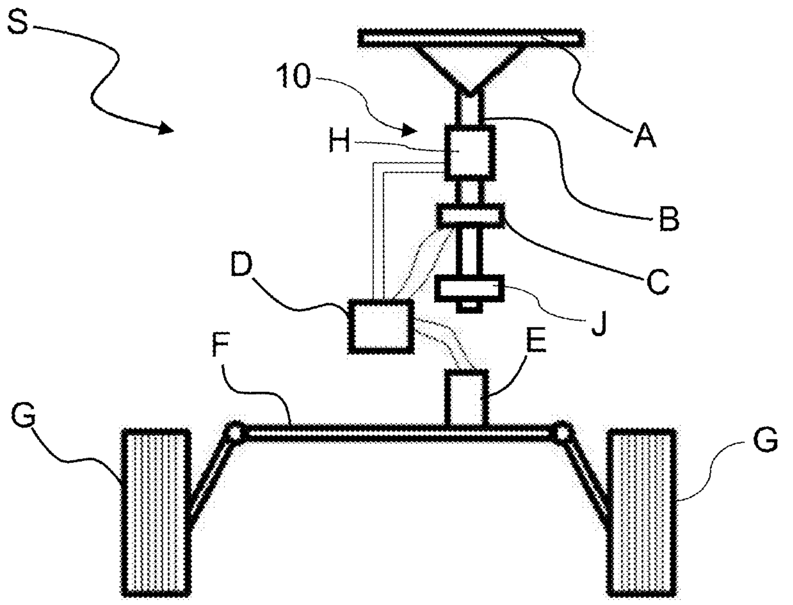
FIG. 1 is a schematic illustration of a steer-by-wire steering system in accordance with the present disclosure.

FIG. 1 illustrates a steer-by-wire system S for a vehicle incorporating a steering assembly 10 in accordance with the present disclosure. The steer-by-wire system S includes a handwheel actuator, in the form of a steering wheel A, to allow a driver of the vehicle to provide an input steering command. The steering wheel A is connected to an end of an elongate steering shaft B.

A steering input applied through the steering wheel A is measured by a steering sensor forming part of the steering column assembly, shown schematically at C in FIG. 1. A signal representative of the steering input (i.e. the rotation of the steering wheel A and steering shaft B) is transmitted from the sensor C to an electronic control unit (ECU) D which, in turn, controls a steering axle actuator E. The steering axle actuator E applies the steering input to the steering axle F, and therefore steers the steered wheels G as a function of the rotational position of the steering wheel A.

The electronic control unit D is also configured to supply a current to a torque feedback motor H connected to the shaft B and which applies a torque in the opposite direction to the torque applied at the steering wheel A in order to provide a sensation of "road feel" to the driver.

A damper J, described in greater detail below, is connected to the steering shaft B at a location distal from the steering wheel A. The damper J is a passive, viscous damper in this exemplary arrangement, and introduces a feedback torque to the steering wheel A when a steering input is applied. Whilst FIG. 1 illustrates the damper J mounted part way along the steering shaft B, i.e. between the ends of the steering shaft B such that the steering shaft B passes through the damper J, this need not be the case. Instead, the damper J may be mounted or located at the end of the steering shaft B remote from the steering wheel A.

Figure 2:
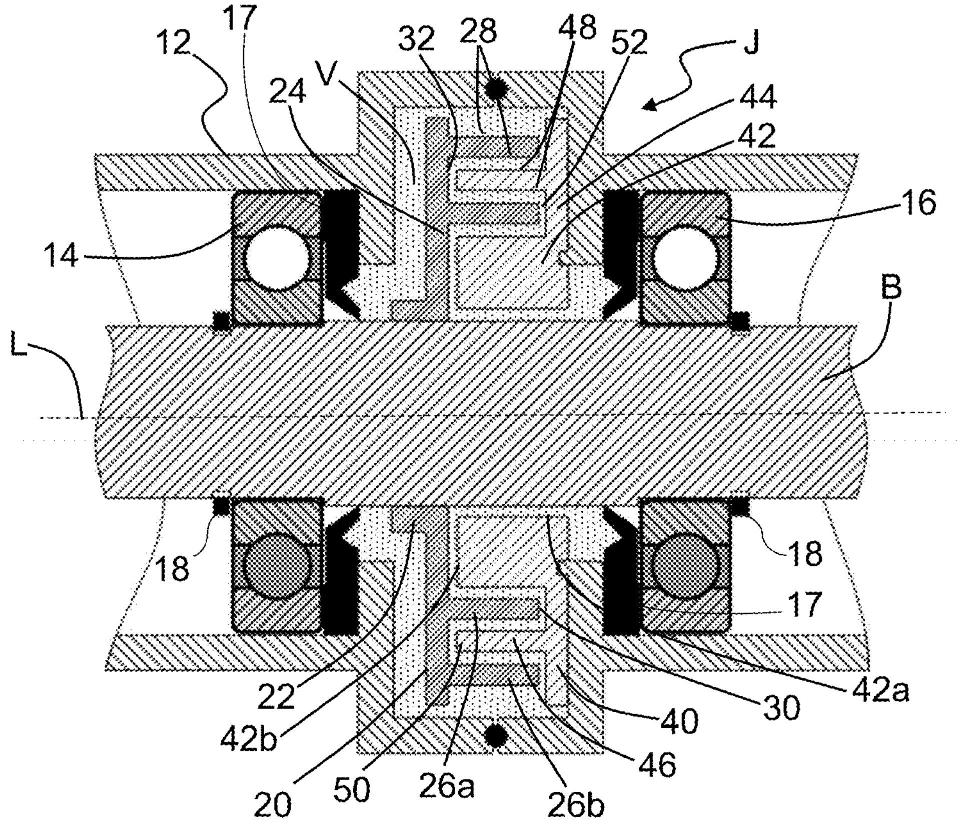
FIG. 2 is a cross-sectional view of a first exemplary arrangement of a damper arrangement forming part of a steering assembly for a steer-by-wire vehicle in accordance with the present disclosure.

FIG. 2 illustrates a cross-sectional view of an exemplary arrangement of damper J forming part of a steering assembly 10 (FIG. 1) for a steer-by-wire vehicle, wherein the damper J is mounted part way along the steering shaft B. i.e. between the ends of the steering shaft B such that the steering shaft B passes through the damper J. FIG. 2 is intended to illustrate one possible implementation of a damper J within a steering assembly 10 according to an exemplary arrangement of the disclosure, and to outline the basic operating principles thereof.

The damper J includes a housing 12 enclosing a rotor 20 coupled to the steering shaft B and rotatable therewith, and a stator 40 mounted to, and rotatably fixed relative to the housing 12. A damping fluid V, in the form of a silicone fluid (e.g. a silicone oil) in this exemplary arrangement, is contained within the housing 12 and is arranged between and around the rotor 20 and stator 40. In the arrangement of FIG. 2, each of the housing 12, rotor 20 and stator 40 are annular when viewed along the longitudinal axis L of the steering shaft B, so as to surround the steering shaft B.

As is described in greater detail hereinafter, in use, as the steering shaft B is rotated, e.g. in response to a steering input applied through the steering wheel A (FIG. 1), the rotor 20 is rotated therewith and relative to the stator 40. As a result of its viscosity, the damping fluid V located between the rotor 20 and the stator 40 is sheared resulting in a drag force being applied to the rotor 20, and therefore to the steering shaft B. This provides the effect of a feedback torque or resistive torque to the steering shaft B, and therefore steering wheel as it is rotated.

Bearings 14, 16 are mounted between the steering shaft and the housing 12 on either side of the rotor 20 and stator 40 to facilitate rotation of the steering shaft B with respect to the housing 12. A pair of annular seals or gaskets 17 are provided between the housing 12 and the steering shaft B, in abutment with the longitudinally inner face of the respective bearing 14, 16, so as to prevent the escape of damping fluid V and/or the ingress of foreign material into the housing 12. The bearings 14, 16, and therefore the seals or gaskets 17, are held in place longitudinally on the steering shaft B by means of a respective circlip 18 mounted on the shaft B.

The rotor 20 has a tubular mounting collar 22 for connection with the steering shaft B and an annular base plate 24 extending radially from the mounting flange 22 and steering shaft B. The collar 22 and base plate 24 are mounted coaxially with the longitudinal axis L of the steering shaft B. The rotor 20 may either be formed of a unitary annulus or ring or may instead be formed of a pair of half annuli connected together. Extending perpendicularly from one annular surface of the base plate 24 are a pair of annular vanes 26*a*, 26*b*, including a radially innermost vane 26*a* and a radially outermost vane 26*b* located radially outward of the radially innermost vane 26*a*. Each of the vanes 26*a*, 26*b* is mounted coaxially with the base plate 24 and extends substantially parallel to the longitudinal axis L of the steering shaft B towards the stator 40 and has a rectangular cross-sectional shape.

Furthermore, the inner and outer walls of each of the vanes 26*a*, 26*b* form radially inner and outer annular shear surfaces 28. The end face of each of the vanes 26*a*, 26*b* also forms a further annular shear surface 30. The shear surfaces 28, 30 are arranged to act with corresponding shear surfaces of the stator 40 and the damping fluid V to provide damping to the steering shaft B, as described in greater detail below. An annular passage 32 is also defined between the vanes 26*a*, 26*b* and has a width, defined in a radial direction, greater than the width of each of the vanes 26*a*, 26*b*.

The stator 40 has a tubular collar 42 extending around, but spaced from, the steering shaft B. The radially innermost wall of the collar 42 forms an annular shear surface 42*a* and the end face of the collar 42 forms a radially extending, planar annular shear surface 42*b*. A base plate 44 extends radially outwardly from the radially outermost wall of the tubular collar 42 and is mounted to an internal surface of the housing 12. In a similar manner to the rotor 20, the stator 40 may either be formed of a unitary annulus or ring or may instead be formed of a pair of half annuli connected together. Extending perpendicularly from the base plate 44 is an annular vane 46 arranged coaxially with the longitudinal axis L of the steering shaft B. The vane 46 extends substantially parallel to the longitudinal axis L of the steering shaft B towards the rotor 20 and into the annular passage 32 between the vanes 26*a*, 26*b* of the rotor 20, and has a rectangular cross-sectional shape.

The radially innermost and outermost faces of the vane 46 form radially inner and outer annular shear surfaces 48. The end face of the vane 46 also forms a further annular shear surface 50. An annular passage 52 is also defined between the vane 46 and the radially outermost annular face of the tubular collar 42 and has a width, defined in a radial direction, greater than the radially innermost vane 26*a*.

In the described arrangement, the vane 46 of the stator 40 is received within the annular passage 32 between the inner and outer vanes 26*a*, 26*b* of the rotor 20 and the radially innermost vane 26*a* of the rotor 20 is received within the annular passage 52 between the radially inner annular shear surface 48 of the vane 46 and the radially outer face of the collar 42, such that the vanes 26*a*, 26*b* and 46 of the rotor 20 and stator 40 overlap fit between each other. The annular shear surfaces 28, 42*a* and 48 of the rotor 20 and stator 40 are positioned adjacent to but spaced apart from one another and define a gap of constant width therebetween. Further, the annular shear surface 30 at the ends of the rotor vanes 26*a*, 26*b* are positioned adjacent the base plate 44 of the stator 40 and the annular shear surface 50 at the end of the stator vane 46 is positioned adjacent the base plate 24 of the rotor 20 and in each case a gap is defined therebetween. In use, as the rotor 20 is rotated with the steering shaft B, the damping fluid V located between the shear surfaces is sheared, and a drag force is applied to the rotor 20. As will be described in further detail below, the amount of drag is dependent on the total area of shear surfaces positioned adjacent one another as this has an impact on the amount of shearing of the damping fluid V.

Figure 3:
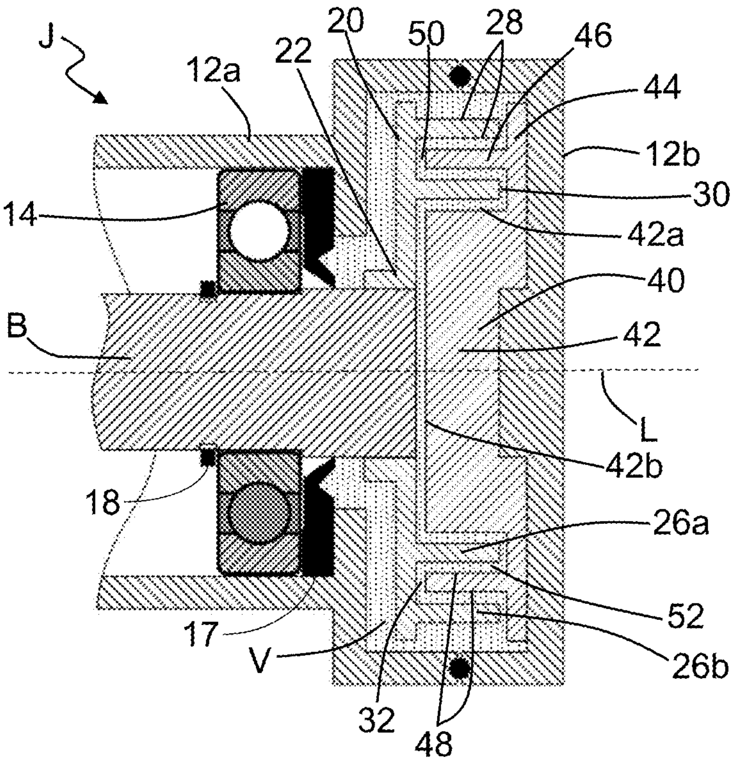
FIG. 3 is a cross-sectional view of a second exemplary arrangement of a damper arrangement forming part of a steering assembly for a steer-by-wire vehicle in accordance with the present disclosure.

FIG. 3 illustrates a cross-sectional view of a second exemplary arrangement of damper J forming part of a steering assembly 10 (FIG. 1) for a steer-by-wire vehicle, wherein the damper J is mounted at an end of the steering shaft B, i.e. an end opposite the steering wheel A (FIG. 1). FIG. 3 is intended to illustrate another possible implementation of a damper J within a steering assembly 10 according to an exemplary arrangement of the disclosure.

The arrangement of FIG. 3 is similar to that of FIG. 2, wherein like features are denoted by like references and in the interests of brevity only the differences will be described. The main differences between the arrangement of FIG. 3 when compared with the arrangement of FIG. 2 is that in this case the stator 40 is not annular, as it does not extend around the steering shaft B. Instead, the base plate 44 is solid and is positioned adjacent an end of the steering shaft B, opposite the steering wheel A (FIG. 1). Further, instead of having a tubular collar 42 extending around, but spaced from, the steering shaft B, the stator 40 has a central disc portion 42 from which the base plate 44 extends radially outwardly. The central disc portion 42 is raised relative to the base plate 44 and forms an annular shear surface 42*a* and the end face of the central disc portion 42 forms a planar circular shear surface 42*b*. The planar circular shear surface 42*b* is positioned adjacent to but spaced from an end of the steering shaft B, remote from the steering wheel A (FIG. 1).

Additionally, instead of the housing 12 being annular, in this case it has a first annular portion 12*a* that extends around the steering shaft B, and a second end plate portion 12*b* secured to the first annular portion 12*a*. Further, instead of having a pair of bearings 14, 16 and a pair of annular seals or gaskets 17, only a single bearing 14 is provided, and only a single annular seal or gasket 17 is provided between the housing 12 and the steering shaft B, in abutment with the longitudinally outer face of the bearing 14, so as to prevent the escape of damping fluid V and/or the ingress of foreign material into the housing 12. The bearing 14, and therefore the seal or gasket 17, is held in place longitudinally on the steering shaft B by a circlip 18 mounted on the shaft B.

It will be understood that the interrelationship between the rotor 20, stator 40 and damping fluid V in the operation of the damper J of FIG. 3 is as described above in relation to FIG. 2.

Figure 4:
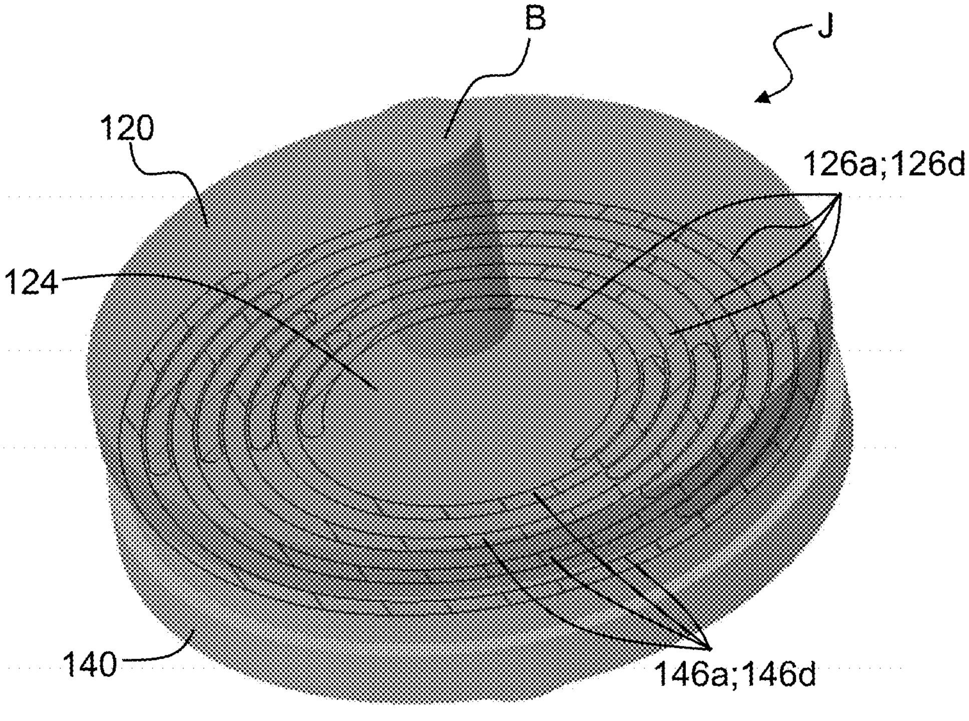
FIG. 4 is a top perspective view of a rotor and stator of a damper forming part of a steering assembly for a steer-by-wire vehicle in accordance with the present disclosure.
Figure 5:
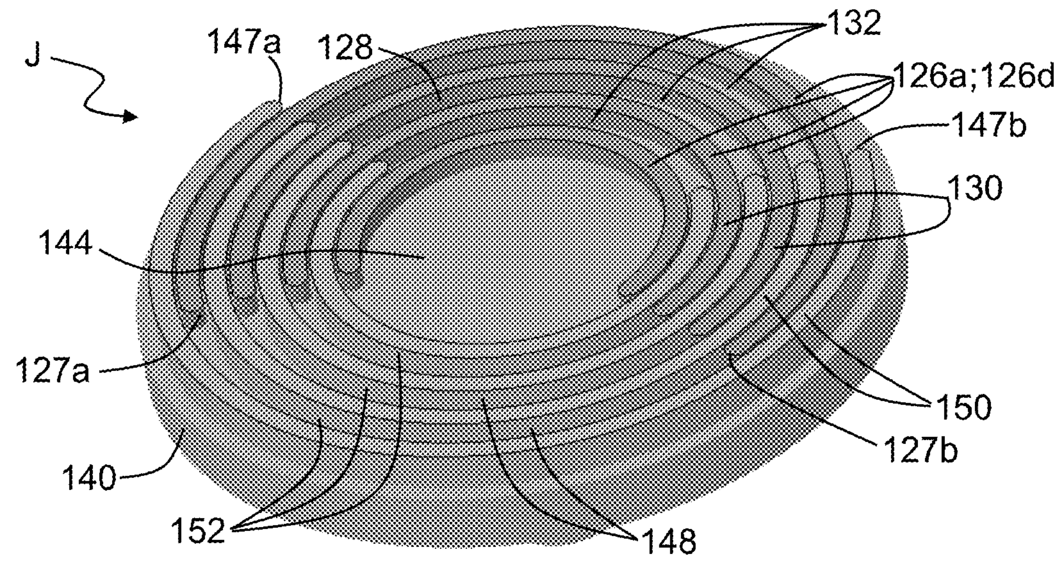
FIG. 5 is a top perspective view of the arrangement of FIG. 4 with the rotor base plate removed.
Figure 6:
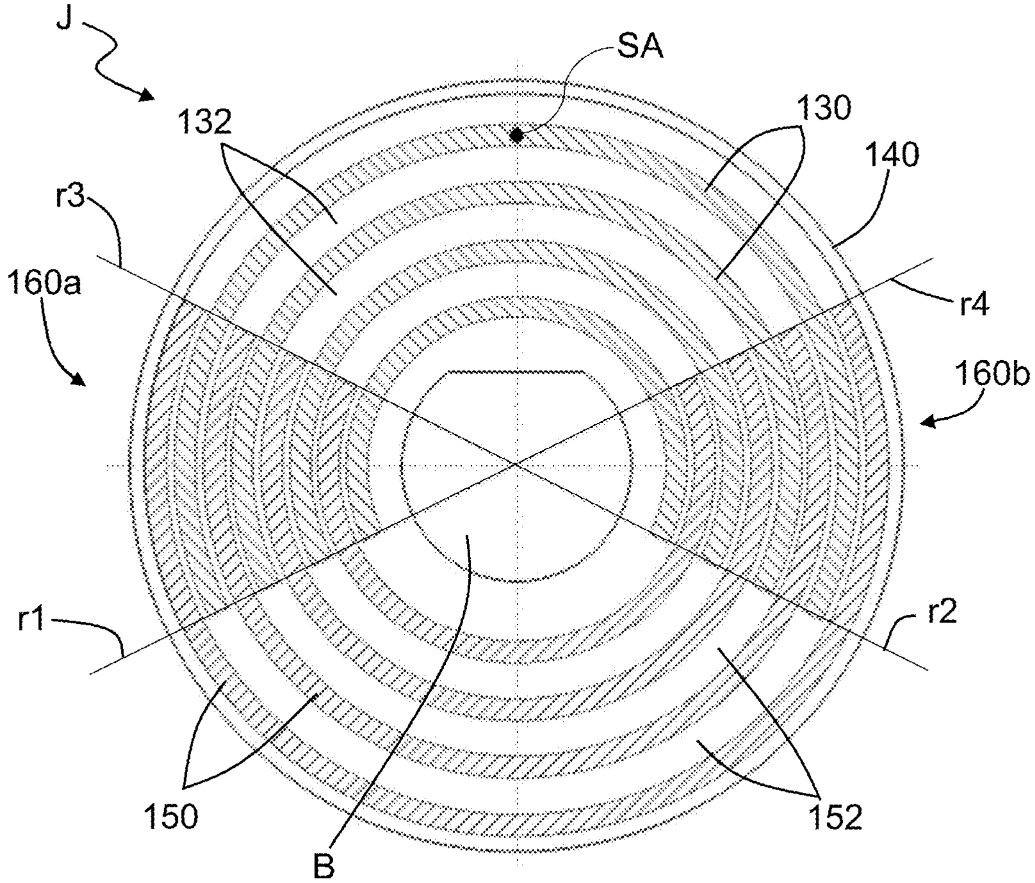
FIG. 6 is a top view of the arrangement of FIG. 5 when a steering column is in a straight-ahead position.

FIGS. 4 to 6 illustrate a damper J according to a third exemplary arrangement of the disclosure wherein the steering shaft B (FIGS. 1 and 4) is shown in a straight-ahead position. The arrangement of FIGS. 4 to 6 is similar to the arrangements of FIGS. 2 and 3, wherein like features are denoted by like references incremented by '100'. The damper J according the present exemplary arrangement is described and illustrated with the housing 12 removed, and is configured to be positioned at the end of a steering shaft B, as described in relation to FIG. 3. However, it will be appreciated that the damper J may alternatively be implemented in an arrangement according to FIG. 2, i.e. part way along a steering shaft B, with minor modification.

In the present exemplary arrangement, the rotor 120 is generally circular when viewed along the longitudinal axis of the steering shaft B and has a circular base plate 124 secured to the end of the steering shaft B opposite to the steering wheel A and arranged coaxially with the steering shaft B. The rotor 124 has four part-annular or arcuate vanes 126*a*; 126*d* arranged coaxially with the axis of the steering shaft B and extending substantially perpendicularly from the face of the base plate 124 opposed to the stator 140. Further, the vanes 126*a*;126*d* extend parallel with and are radially offset from one another so as to define three part-annular or arcuate passages 132 therebetween. The radially inner and outer faces of each vane 126*a*;126*d* form radially inner and outer part-annular shear surfaces 128. Additionally, the end face of each of the vanes 126*a*;126*d* forms a further part-annular shear surface 130. Each vane 126*a*;126*d* extends between first and second vane ends 127*a*, 127*b*.

As shown in FIGS. 5 and 6, the first ends 127*a* of each of the respective vanes 126*a*;126*d* lie on a common radius r1 and the second ends 127*b* of each of the respective vanes 126*a*;126*d* also lie on a common radius r2. The common radii r1, r2 converge towards a centre point of the rotor 120.

The stator 140 is also generally circular when viewed along the longitudinal axis of the steering shaft B and has a circular base plate 144. The stator 140 has four part-annular or arcuate vanes 146*a*;146*d* arranged coaxially with the axis of the steering shaft B and extending substantially perpendicularly from the face of the base plate 144 opposed to the rotor 120. Further, the vanes 146*a*;146*d* extend parallel with and are radially offset from one another so as to define three part annular or arcuate passages 152 therebetween. The radially inner and outer faces of each vane 146*a*;146*d* form radially inner and outer part-annular shear surfaces 148. Further, the end face of each of the vanes 146*a*; 146*d* forms a further part-annular shear surface 150. Each vane 146*a*; 146*d* extends between first and second vane ends 147*a*, 147*b*.

The vanes 146*a*; 146*d* are arranged in a similar manner to the vanes 126*a*;126*d* of the rotor 120. As shown in FIGS. 5 and 6, the first terminal ends 147*a* of each of the respective vanes 146*a*;146*d* lies on a common radius r3 and the second terminal ends 147*b* of each of the respective vanes 146*a*; 146*d* lies on a common radius r4. The common radii r3, r4 also converge towards a centre point of the rotor 120.

Figure 9:
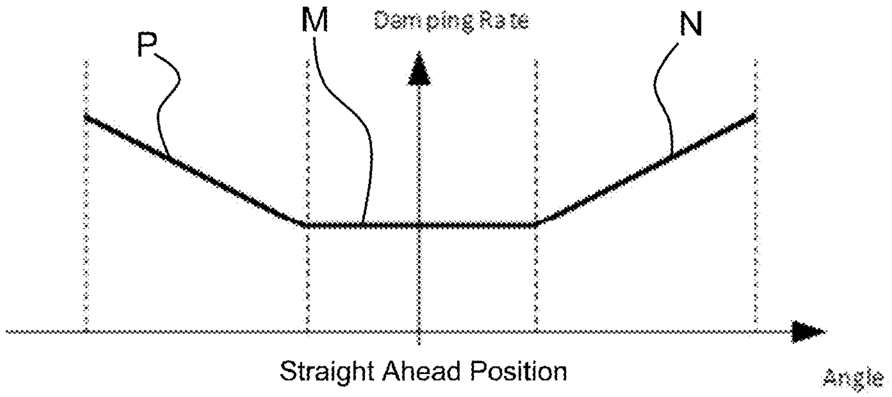
FIG. 9 is a graph depicting the relationship between the angle of rotation of the steering column and damping for the arrangement of FIGS. 4 to 8.

In the present disclosure, the rotor 120 (FIG. 4) and the stator 140 are brought together such that a portion of each of the vanes 126*a*;126*d* of the rotor is received within the passages 152 between the vanes 146*a*; 146*d* of the stator 140 and a portion of each of the vanes 146*a*;146*d* of the stator is received within the passages 132 between the vanes 126*a*; 126*d* of the rotor 120. As shown in FIG. 6, as a result of the arrangement of the ends 127*a*, 127*b*, 147*a*, 147*b* of the vanes, two diametrically opposed vane overlap regions 160*a*, 160*b* are formed wherein vanes 126*a*;126*d* and vanes 146*a*;146*d* partially overlap in a peripheral direction when viewed along the longitudinal axis L of the steering shaft B. Within these overlap regions 160*a*, 160*b* the part-annular shear surfaces 128 of the rotor 120 are positioned adjacent the part-annular shear surfaces 148 of the stator 140. When the steering shaft B is in the straight ahead position, as shown in FIGS. 4 to 6, the total area of part-annular shear surfaces 128, 148 positioned adjacent one another in the overlap regions 160*a*, 160*b* is at a minimum, as described in greater detail below in relation to FIG. 9. Further, as described above, the amount of drag between the rotor 120 (FIG. 4) and stator 140 is dependent on the total area of part-annular shear surfaces 128, 148 positioned adjacent one another as this has an impact on the amount of shearing of the damping fluid V. The centre point of the radially outermost vane 126*d* of the rotor 120 in the straight ahead position of the steering wheel A is marked as SA in the drawings.

Figure 7:
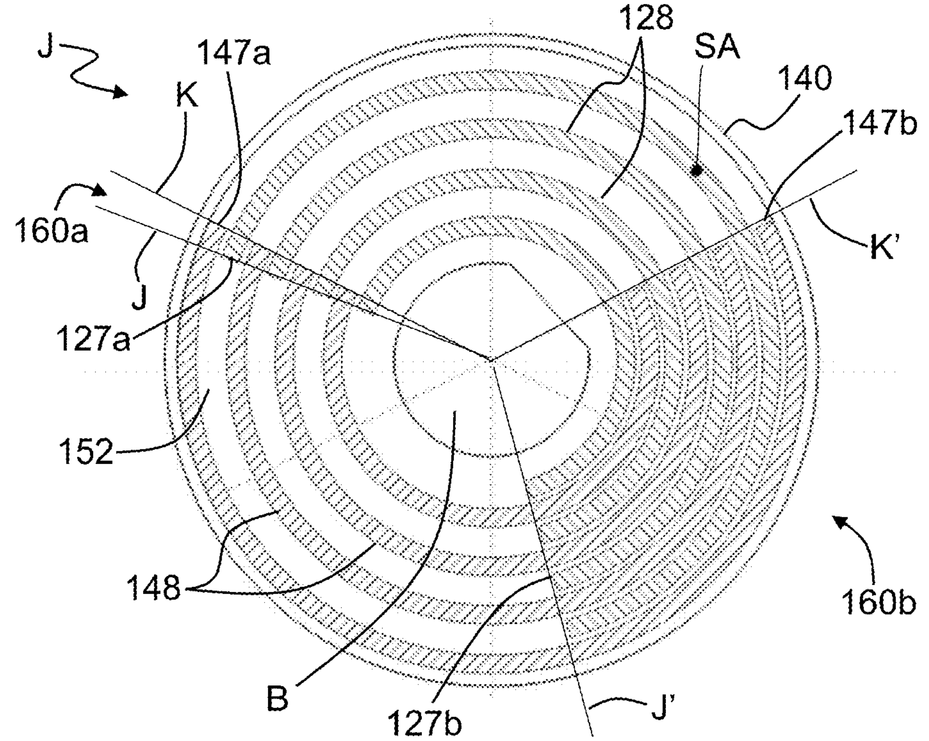
FIG. 7 is a top view of the arrangement of FIG. 5 when a steering column is partially rotated clockwise.

FIG. 7 illustrates the damper J of FIGS. 4 to 6 wherein the steering shaft B is partially rotated in a clockwise direction, as shown by the centre point SA of the outermost vane 126*d* of the rotor 120. The rotor 120 (FIG. 4), which is rotatable with the steering shaft B, is rotated relative to the stator 140 and the part-annular shear surfaces 128, 148 of the rotor and stator 120, 140 are moved relative to one another. The first overlap region 160*a* is reduced as the first ends 127*a* of the vanes 126*a*; 126*d* of the rotor are moved towards the end of the passages 152 in the stator 140. Further, the second overlap region 160*b* is increased as the second ends 127*b* of the vanes 126*a*; 126*d* of the rotor move further into the passages 152. However, the total area of part-annular shear surfaces 128, 148 positioned adjacent one another remains constant during rotation of the steering shaft B from the straight ahead position of FIGS. 4 to 6 to the position of FIG. 7. As a result, and as shown by the central region M in FIG. 9, the damping remains constant during this phase of rotation.

Figure 8:
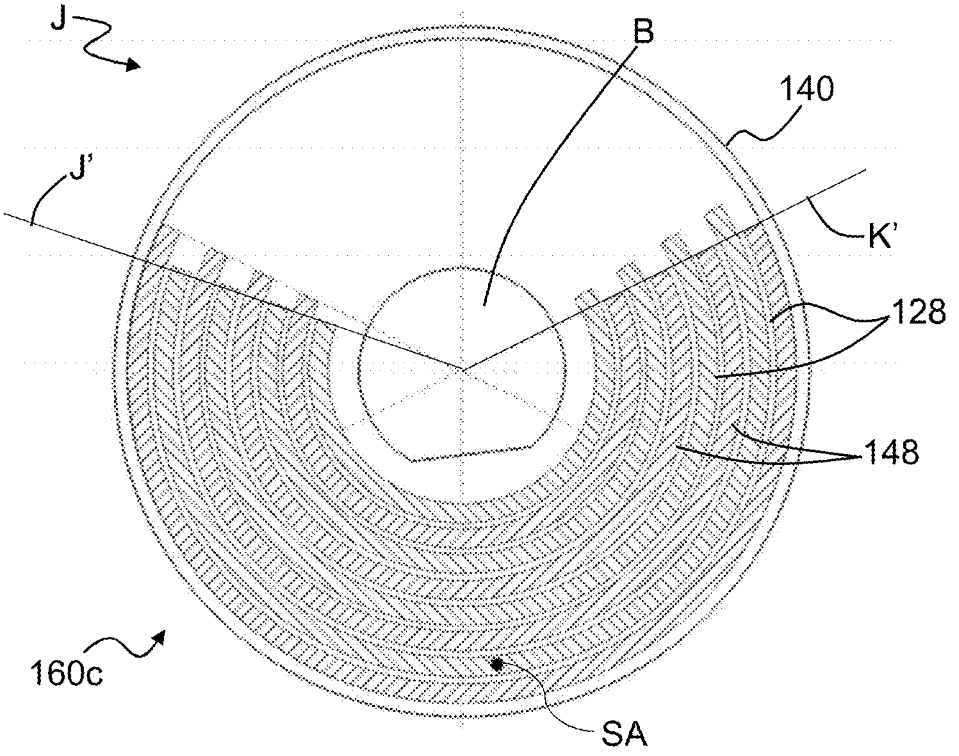
FIG. 8 is a top view of the arrangement of FIG. 5 when a steering column is fully rotated clockwise.

FIG. 8 illustrates the damper J of FIGS. 4 to 6 wherein the steering shaft B is fully rotated in a clockwise direction. In this case, a single overlap region 160*c* exists and the total area of part-annular shear surfaces 128, 148 positioned adjacent one another is at a maximum. During rotation of the steering shaft B from the partially rotated position of FIG. 7 to the position of FIG. 8, the total area of part-annular shear surfaces 128, 148 positioned adjacent one another steadily increases. As a result, and as shown by the region N in FIG. 9, the damping steadily increases during this phase of rotation, such that damping increases steadily and proportionally to the angle of rotation of the steering shaft B.

It will also be appreciated that the described changes in damping will also be experienced when rotating the steering shaft B, and therefore the rotor 120 (FIG. 4), in an anti-clockwise direction from the straight ahead position of FIGS. 4 to 6. The change in damping is shown by region P in FIG. 9. It will also be appreciated that the overall amount of damping is dependent, amongst other things, on the number of vanes of the rotor and/or stator.

Figure 10:
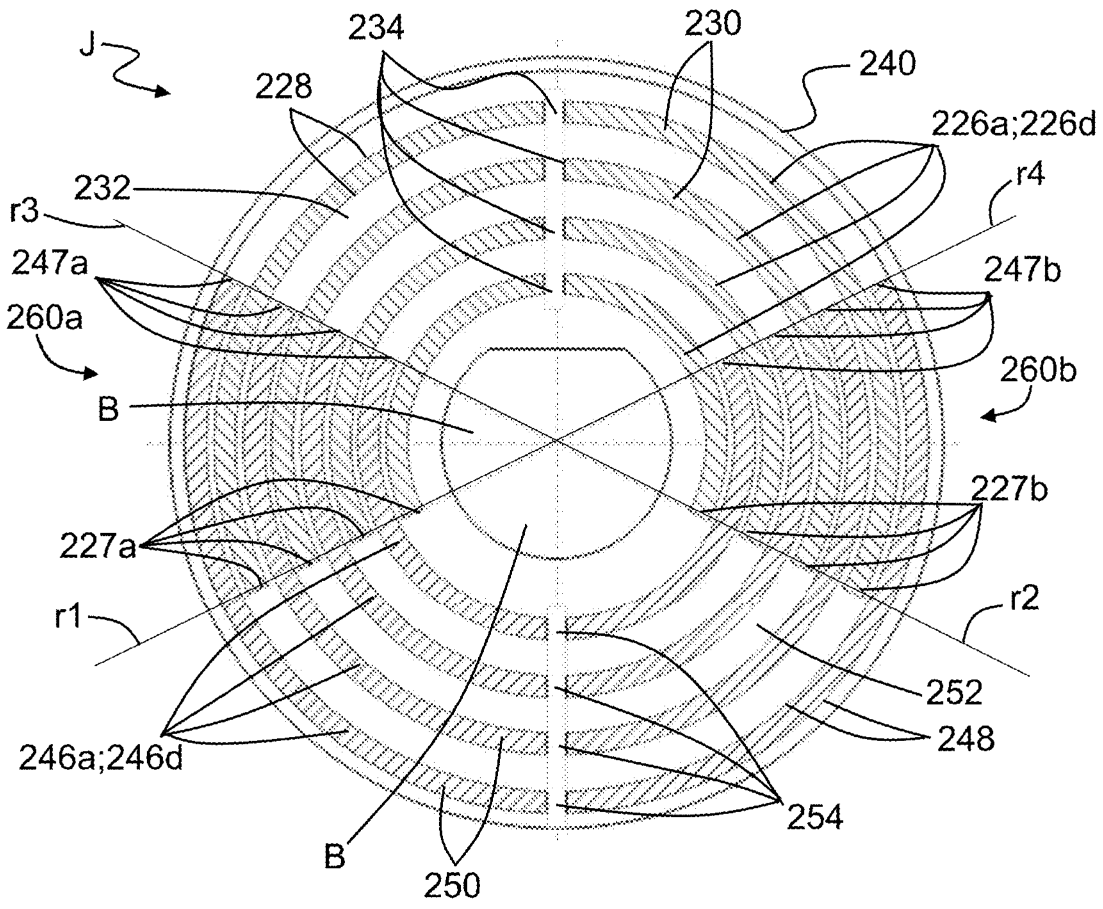
FIG. 10 is a top view of a second variant of a rotor and stator of a damper forming part of a steering assembly for a steer-by-wire vehicle in accordance with the present disclosure.

FIG. 10 illustrates a damper J according to a fourth exemplary arrangement of the disclosure wherein the steering shaft B is shown in a straight-ahead position. The arrangement of FIG. 10 is similar to the arrangement of FIGS. 4 to 8, wherein like features are denoted by like references incremented by '100'.

The arrangement of FIG. 10 differs from that of FIGS. 4 to 8 in that each of the vanes 226*a*; 226*d* of the rotor (not shown) includes a slot 234 in order to provide fluid communication across the vanes 226*a*; 226*d* and between the passages 232. Likewise, each of the vanes 246*a*; 246*d* of the stator 240 includes a slot 254 in order to provide fluid communication across the vanes 246*a*; 246*d* and between the passages 252. In the present arrangement, the slots 234 of the rotor are circumferentially aligned such that a substantially straight passage extends radially from a centre to a periphery of the rotor. Likewise, the slots 254 of the stator 240 are also circumferentially aligned such that a substantially straight passage extends radially from a centre to a periphery of the stator 240. The slots 234, 254 of the rotor and stator 240 are aligned with each other when the steering shaft B is in the straight-ahead position, as shown in FIG. 10.

In use, as the rotor is rotated relative to the stator 240, the slots 234, 254 allow damping fluid V to be moved and distributed between the passages 232, 252 and can be used to adjust or tailor the damping and/or feedback torque provided to the steering shaft B.

Figure 11:
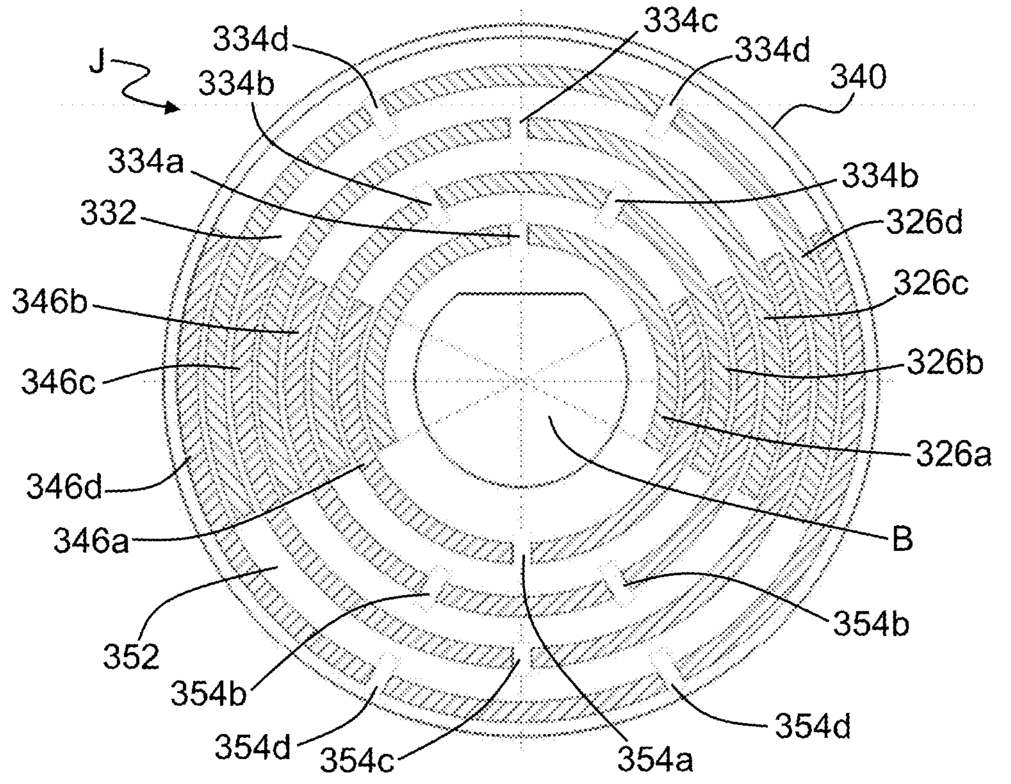
FIG. 11 is a top view of a third variant of a rotor and stator of a damper forming part of a steering assembly for a steer-by-wire vehicle in accordance with the present disclosure.

FIG. 11 illustrates a damper J according to a fifth exemplary arrangement of the disclosure wherein the steering shaft B is shown in a straight-ahead position. The arrangement of FIG. 11 is similar to the arrangement of FIG. 10, wherein like features are denoted by like references incremented by '100'.

The arrangement of FIG. 11 differs from that of FIG. 10 in that instead of the slots 234, 254 being circumferentially aligned they are offset. For example, in the case of the rotor (not shown), the innermost vane 326*a* has a single slot 334*a*, the next vane 326*b* has a pair of slots 334*b* circumferentially offset from, and located either side of, slot 334*a*. The next vane 326*c* has a single slot 334*c* circumferentially aligned with slot 334*a* and the radially outermost vane 326*d* has a pair of slots 334*d* circumferentially aligned with slots 334*b*. Therefore, when the steering shaft B is in the straight-ahead position, a tortuous passage is defined between a centre and the periphery of the stator 340. The slots 354*a*; 354*d* of the stator 340 are arranged in a similar manner and will not be described further.

In a similar manner to the arrangement of FIG. 10, in use, as the rotor is rotated relative to the stator 340, the slots 334*a*; 334*d*, 354*a*; 354*d* allow damping fluid V to be moved and distributed between the passages 332, 352 and can be used to adjust or tailor the damping and/or feedback torque provided to the steering shaft B.

Figure 12:
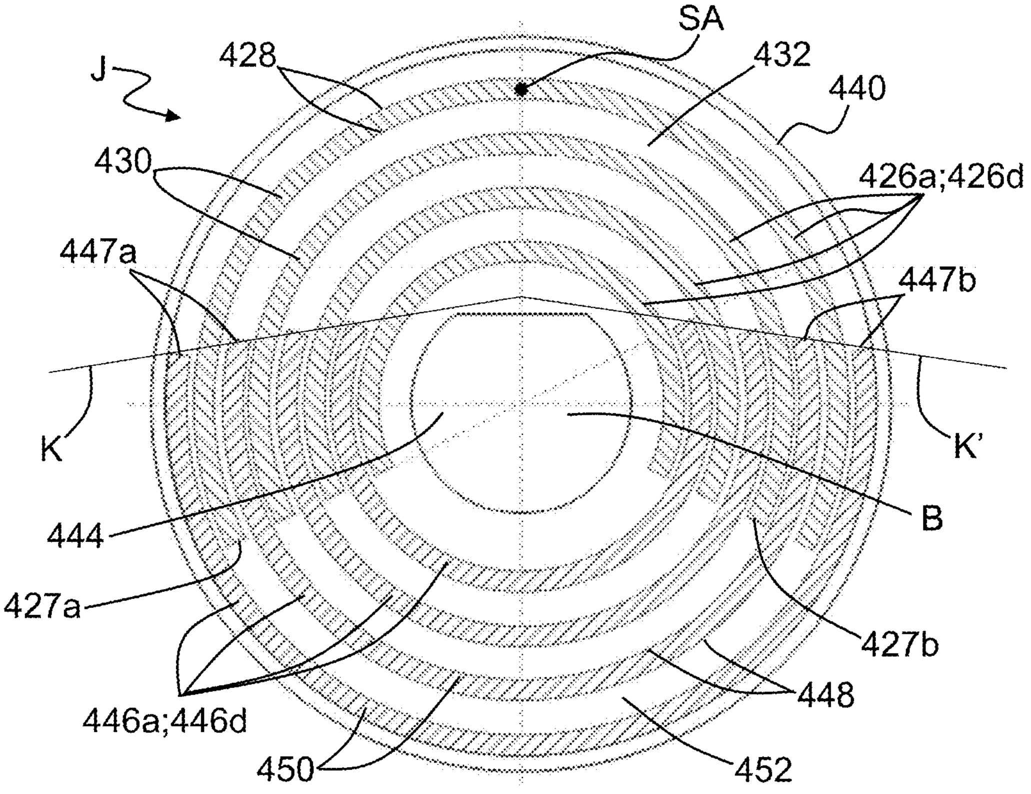
FIG. 12 is a top view of a fourth variant of a rotor and stator of a damper forming part of a steering assembly for a steer-by-wire vehicle in accordance with the present disclosure.

FIG. 12 illustrates a damper J according to a sixth exemplary arrangement of the disclosure wherein the steering shaft B is shown in a straight-ahead position. The arrangement of FIG. 12 is similar to the arrangement of FIGS. 4 to 8, wherein like features are denoted by like references incremented by '300'. The arrangement of FIG. 12 differs from the arrangement of FIGS. 4 to 8 in the relative positions of the first and second ends 447*a*, 447*b* of the stator vanes 446*a*; 446*d*, in other words the lengths of the vanes.

In the exemplary arrangement, the circumferential extent of each vane 446*a*; 446*d* decreases successively from the radially innermost vane 446*a* to the radially outermost vane 446*d*. The vanes 446*a*; 446*d* extend circumferentially for approximately 232°, 216°, 205° and 196° respectively and are arranged symmetrically on either side of the "straight ahead" position SA. Therefore, for each stator vane 446*a*; 446*d* the first end 447*a* of the vane extends clockwise beyond the first end 447*a* of the adjacent vane located radially outwardly. In a similar manner, for each vane 446*a*; 446*d* the second end 447*b* of the vane extends anti-clockwise beyond the second end 447*b* of the adjacent vane located radially outwardly. The plane K defined by the first ends 447*a* and the plane K' defined by the second ends 447*b* intersect at a point away from the centre of the stator 440.

Figure 13:
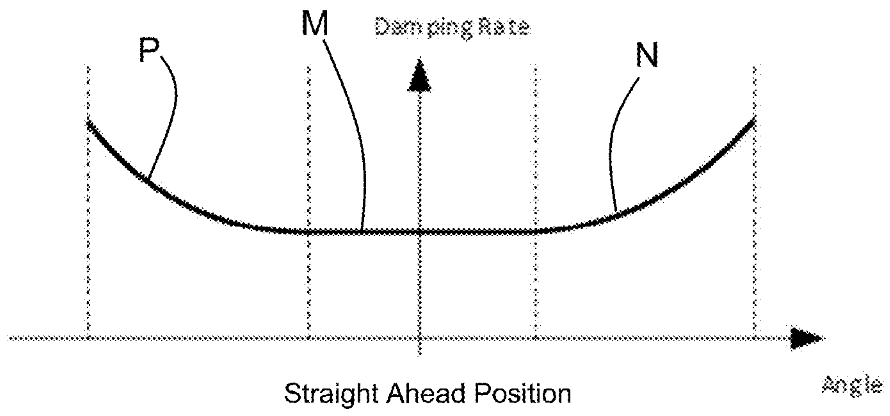
FIG. 13 is a graph depicting the relationship between the angle of rotation of the steering column and damping for the arrangement of FIG. 12.

By changing the relative positions of the first ends 447*a* and second ends 447*b* of the vanes 446*a*; 446*d*, instead of providing a steady increase in damping proportional to the angle of rotation of the steering shaft B, the rate of change of damping increases with angle of rotation. This is shown in region N of FIG. 13 when the steering shaft B is rotated in a clockwise direction. It will also be appreciated that the described changes in damping will also be experienced when rotating the steering shaft B, and therefore rotor (not shown), in an anti-clockwise direction from the straight-ahead position of FIG. 12. The change in damping is shown by region P in FIG. 13.

Therefore, by changing the relative positions of the first and second ends 447*a*, 447*b* of the stator vanes 446*a*; 446*d*, the rate of change of damping with angular position of the steering shaft B can be modified. It will also be appreciated that relative positions of first and second ends 427*a*, 427*b* of the rotor vanes 426*a*; 426*d* may be adjusted, either in addition to or as an alternative to that described above, in order to modify or tailor the rate of change of damping with angular position of the steering shaft B.

Figure 14:
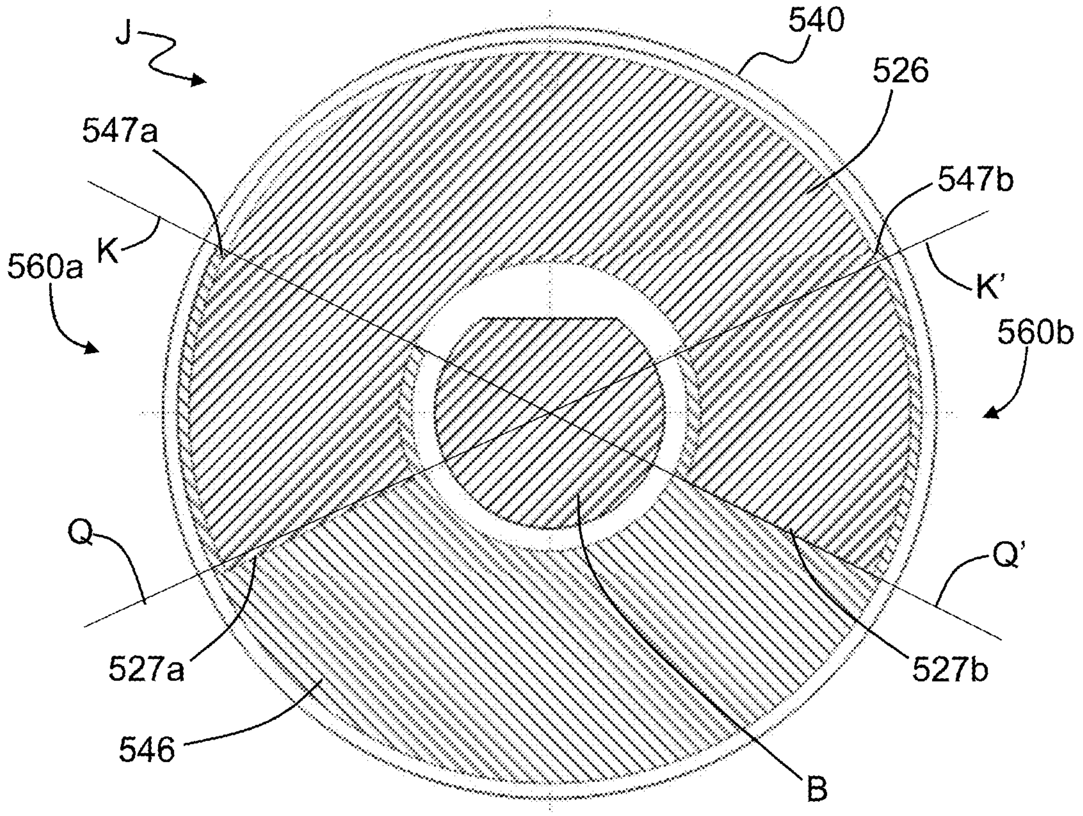
FIG. 14 is a top view of a fifth variant of a rotor and stator of a damper forming part of a steering assembly for a steer-by-wire vehicle in accordance with the present disclosure.
Figure 15:
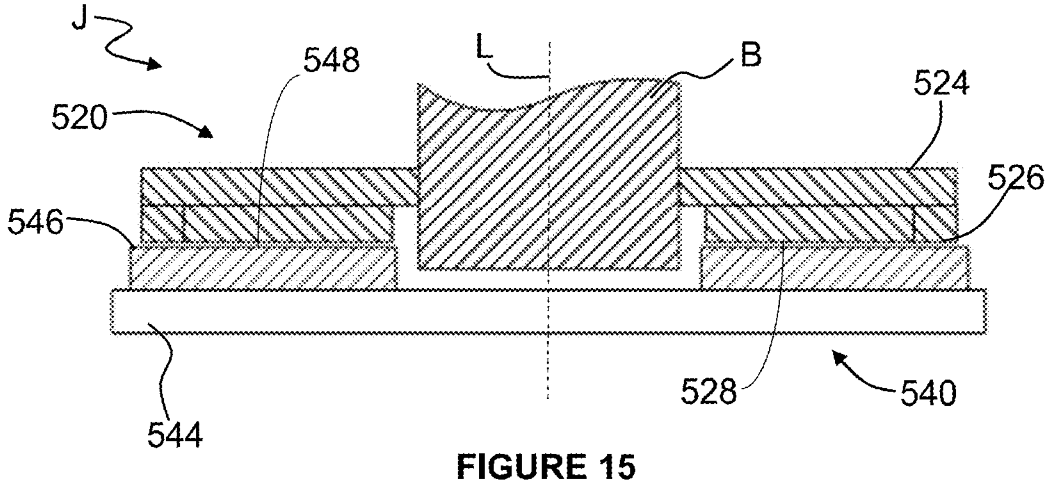
FIG. 15 is a side view of the arrangement of FIG. 14.

FIGS. 14 and 15 illustrate a damper J according to a seventh exemplary arrangement of the disclosure wherein the steering shaft B is shown in a straight ahead position. The arrangement of FIGS. 14 and 15 is similar to the arrangement of FIGS. 4 to 6, wherein like features are denoted by like references incremented by '400'. The damper J according the present exemplary arrangement is configured to be positioned at the end of a steering shaft B, as described in relation to FIG. 3. However, it will be appreciated that the damper J may alternatively be implemented in an arrangement according to FIG. 2, i.e. part way along a steering shaft B, with minor modification.

In the present exemplary arrangement, the rotor 520 (FIG. 15) is generally circular when viewed along the longitudinal axis L of the steering shaft B and has a circular base plate 524 (FIG. 15) which is secured to the steering shaft B. Instead of having vanes as described in the aforementioned arrangements, the rotor 520 has a part-annular (approximately 231° of a complete annulus) shear plate 526 attached to the longitudinally outermost face of the base plate 524, having first and second straight, radially extending ends 527*a*, 527*b* and a planar shear surface 528 formed by its longitudinally outermost face. The shear surface 528 is planar and extends normal to a longitudinal axis L of the steering shaft B. The first and second ends 527*a*, 527*b* of the shear plate 526 each lie on a respective radius Q, Q', wherein the radii Q, Q' converge towards and intersect the centre of the base plate 524 of the rotor 520 and the longitudinal axis L of the steering shaft B when viewed along the longitudinal axis L of the steering shaft B.

The stator 540 is also generally circular when viewed along the longitudinal axis L of the steering shaft B and has a circular base plate 544 (FIG. 15). Instead of having vanes as described in the aforementioned arrangements, the stator 540 also has a part-annular (approximately 231° of a complete annulus) shear plate 546 attached to the longitudinally inner face of the base plate 544 facing and axially spaced from the shear surface 528 of the rotor 520, and having first and second straight, radially extending ends 547*a*, 547*b*. The upper face of the arcuate shear plate 546 forms a planar shear surface 548 extending normal to a longitudinal axis L of the steering shaft B. The first and second ends 547*a*, 547*b* of the shear plate 546 each lie on a respective radius K. K', wherein the radii K, K' converge towards and intersect the centre of the base plate 544 of the stator 540 and the longitudinal axis L of the steering shaft B when viewed along the longitudinal axis L of the steering shaft B.

In the present exemplary arrangement, the rotor 520 and the stator 540 are brought together such that the respective part-annular planar shear surfaces 528, 548 are facing and adjacent to each other, but spaced in the direction of the longitudinal axis L, as shown in FIG. 15 in particular. As shown in FIG. 14, when the steering shaft B is in a straight ahead position the arrangement of the ends 527*a*, 527*b*, 547*a*, 547*b* provides a pair of diametrically opposed overlap regions 560*a*, 560*b* wherein the shear surfaces 528, 548 overlap when viewed along the longitudinal axis L of the steering shaft B. Within these overlap regions 560*a*, 560*b* shear surface 528 is positioned facing and adjacent shear surface 548. When the steering shaft B is in the straight-ahead position, as shown in FIG. 14, the total overlapping area of shear surfaces 528, 548 positioned opposite and adjacent one another is at a minimum. Further, as described above, the amount of drag between the rotor 520 and stator 540 is dependent on the total area of shear surfaces 528, 548 positioned adjacent one another as this has an impact on the amount of shearing of the damping fluid V.

In use, when the steering shaft B is rotated in a clockwise direction from the straight-ahead position of FIG. 14, the rotor 520, which is rotatable with the steering shaft B, is rotated relative to the stator 540 and the shear surfaces 528, 548 are moved relative to one another. It will be appreciated that the radially extending ends 527*a*, 527*b*, 547*a*, 547*b* of the shear plates 526, 546 provide a relationship between damping and angle of rotation of the steering shaft B wherein the damping changes linearly with changes in the angle of rotation of the steering shaft B. The relationship may follow a similar profile to that described in FIG. 9, and need not be described further.

Figure 16:
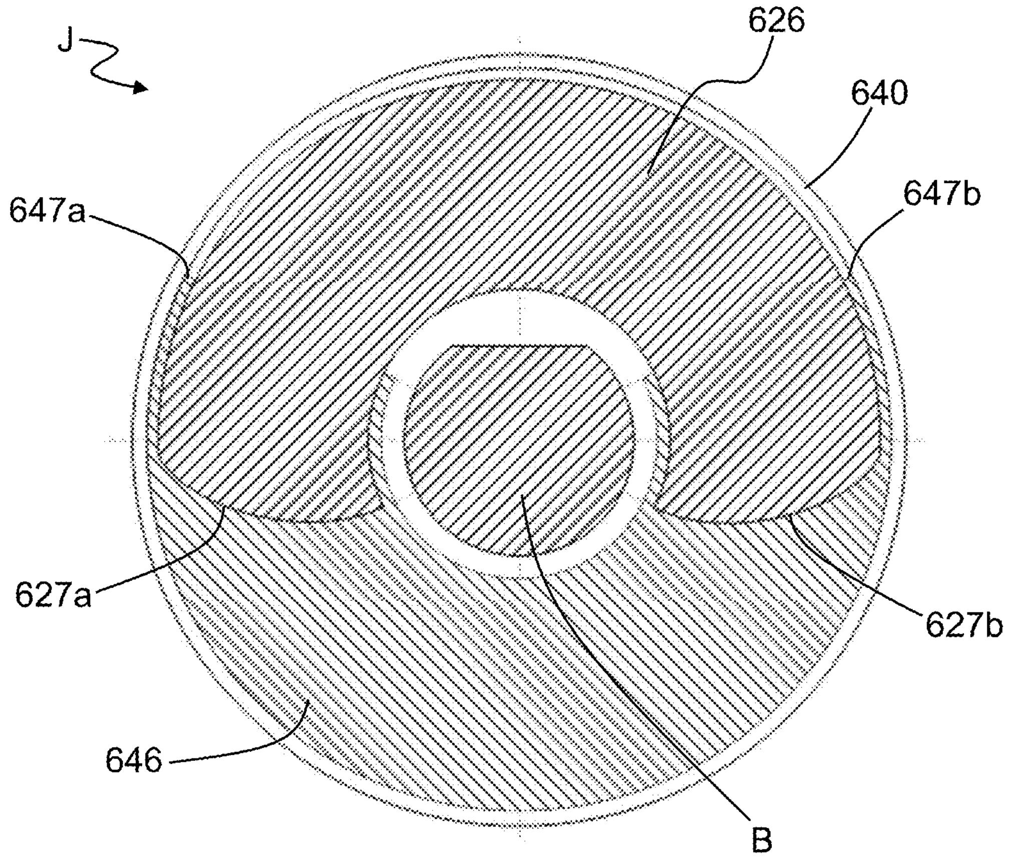
FIG. 16 is a top view of a sixth variant of a rotor and stator of a damper forming part of a steering assembly for a steer-by-wire vehicle in accordance with the present disclosure.

FIG. 16 illustrates a damper J according to an eighth exemplary arrangement of the disclosure wherein the steering shaft B (FIGS. 1 and 4) is shown in a straight ahead position. The arrangement of FIG. 16 is similar to the arrangement of FIGS. 14 and 15, wherein like features are denoted by like references incremented by '100' and only the differences will be described below.

The damper J according the present exemplary arrangement differs from the arrangement of FIGS. 14 and 15 in that the ends of the part-annular planar shear surface 628 of the shear plate 626 rotor (not shown) are curved, namely a first curved end 627*a* and a second curved end 627*b*, rather than straight, radially extending ends as described above. It will be appreciated that curved ends provide a relationship between damping and angle of rotation of the steering shaft B wherein the damping changes non-linearly with changes in the angle of rotation of the steering shaft B. The relationship may follow a similar profile to that described in FIG. 13, and need not be described further.

Figure 17:
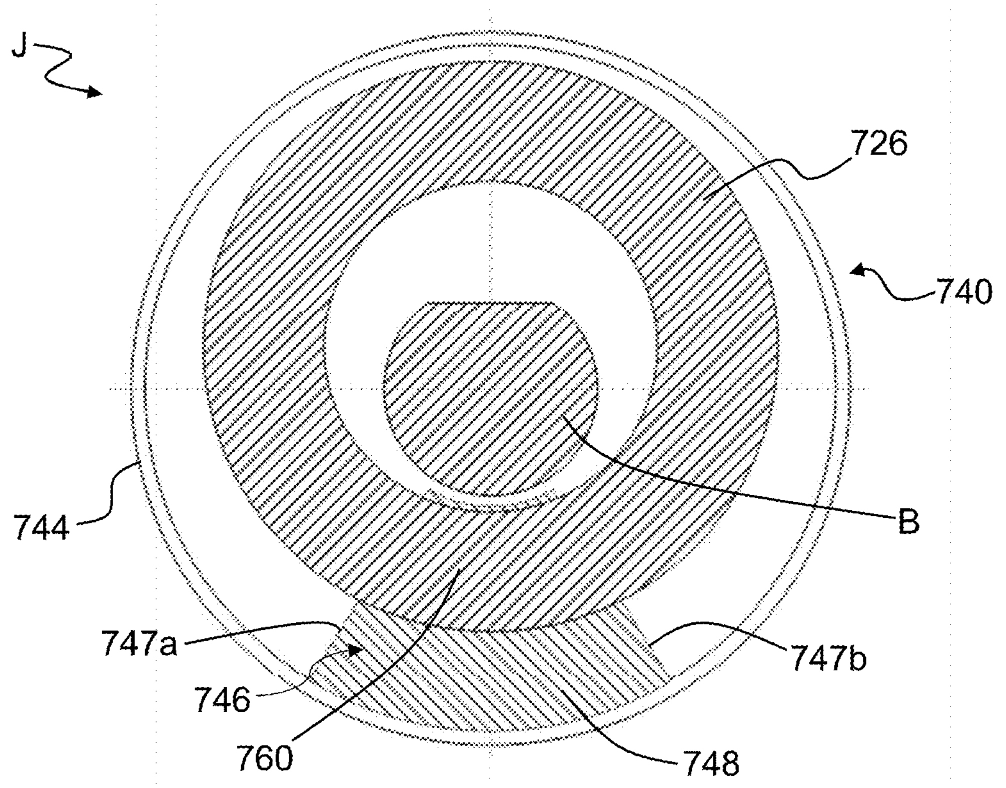
FIG. 17 is a top view of a seventh variant of a rotor and stator of a damper forming part of a steering assembly for a steer-by-wire vehicle in accordance with the present disclosure when a steering column is in a straight ahead position.

FIG. 17 illustrates a damper J according to a ninth exemplary arrangement of the disclosure wherein the steering shaft B is shown in a straight ahead position. The arrangement of FIG. 17 is similar to the arrangement of FIGS. 14 and 15, wherein like features are denoted by like references incremented by '200'.

In the present exemplary arrangement, the rotor (not shown) is generally circular when viewed along the longitudinal axis L of the steering shaft B and has an annular base plate (not shown) that is eccentrically mounted to the steering shaft B and is rotatable therewith. Instead of having an arcuate shear surface attached to the base plate, the rotor has an annular shear plate 726 secured to the longitudinally outer face of the base plate of the rotor, and whose longitudinally outer face forms an annular planar shear surface 728. The annular shear surface 728 has a planar portion extending normal to a longitudinal axis L of the steering shaft B. The annular shear plate 726 of the rotor is mounted coaxially with the base plate on which it is mounted and is therefore eccentrically mounted with respect to the rotational axis of the steering shaft B.

The stator 740 is also generally circular when viewed along the longitudinal axis L of the steering shaft B and has a circular base plate 744. The stator 740 also has a part-annular (approximately 64° of a complete annulus) shear plate 746, having the shape of a truncated sector of a circle centred on the rotational axis of the steering shaft B. The face of the shear plate 746 facing the shear plate 726 of the rotor forms a part-annular shear surface 748 of the base plate 744, having first and second ends 747*a*, 747*b*. The part-annular shear surface 748 faces the annular shear surface 728 of the rotor and is axially spaced from it, i.e. spaced along the longitudinal axis L of the steering shaft B. The part-annular planar shear surface 748 of the stator 740 is planar and extends normal to a longitudinal axis L of the steering shaft B. The ends 747*a*, 747*b* of the shear plate 746 are straight and each lies on a line which intersects the centre of the circular base plate 744.

In the present exemplary arrangement, the rotor and the stator 740 are positioned adjacent to each other such that the annular shear surface 728 of the rotor is positioned facing and adjacent the part-annular shear surface 748 of the stator 740 and spaced along the longitudinal axis L therefrom. As shown in FIG. 17, when the steering shaft B is in a straight-ahead position there is an overlap region 760 between the shear surfaces 728, 748 when viewed along the longitudinal axis L of the steering shaft B. Within this overlap region 760 the annular shear surface 728 of the rotor is positioned adjacent the part-annular shear surface 748 of the stator 740. When the steering shaft B is in the straight-ahead position, as shown in FIG. 17, the total area of shear surfaces 728, 748 positioned adjacent one another is at a minimum.

Figure 18:
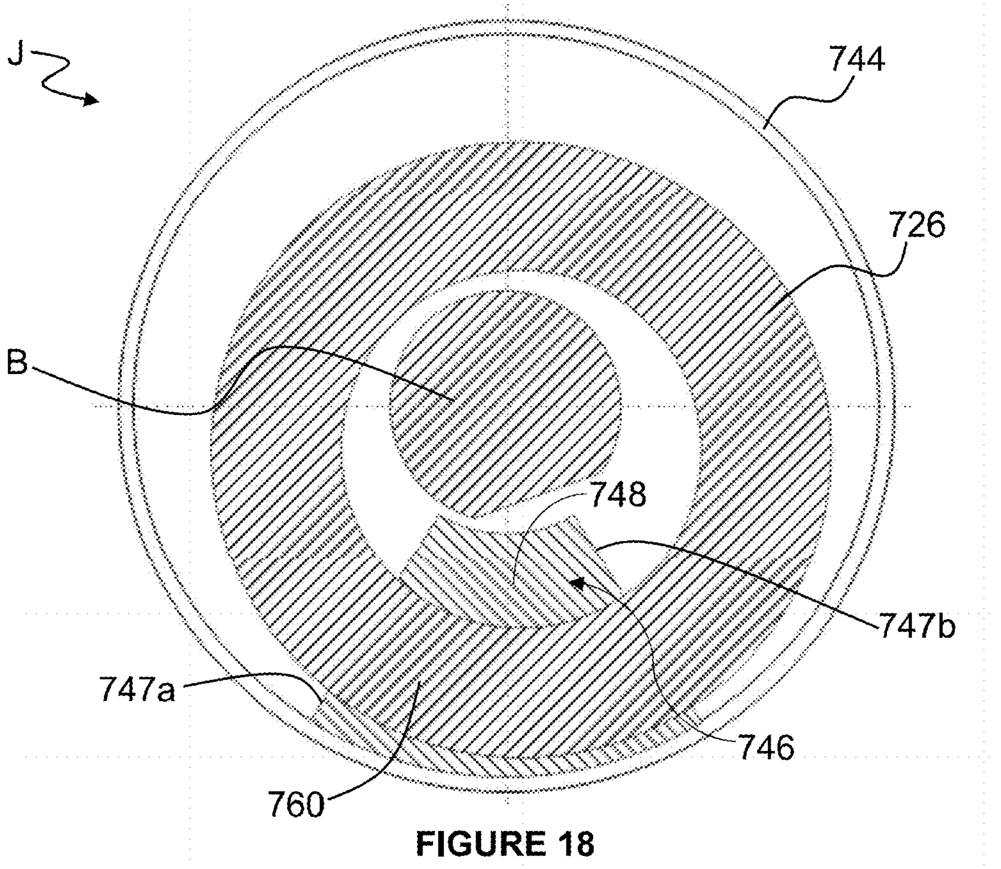
FIG. 18 is a top view of the arrangement of FIG. 17 when a steering column is fully rotated clockwise.

In use, the steering shaft B is rotated in a clockwise direction from the straight-ahead position of FIG. 17 to the fully rotated position of FIG. 18. Due to the eccentrically mounted rotor 720 and annular shear plate 726, which is rotatable with the steering shaft B, the annular shear surface 728 of the rotor both rotates and translates relative to the stator 740 as the steering shaft B rotates. For example, the annular shear surface 728 both rotates with respect to the stator shear surface 748, and translates radially across the stator shear surface 748 towards a periphery of the stator 740, as the steering shaft B rotates. As the annular shear surface 728 of the rotor translates, the overlapping area of shear surfaces 728, 748 positioned adjacent and opposite one another increases to a maximum. As the amount of shearing is dependent on the size of the overlapping area of shear surfaces 728, 748 positioned adjacent one another, the shearing, and therefore damping, is also increased as the steering shaft B is rotated. It will also be appreciated that a corresponding effect will be experienced when the steering shaft B is rotated in an anti-clockwise direction from the straight-ahead position.

Figure 19:
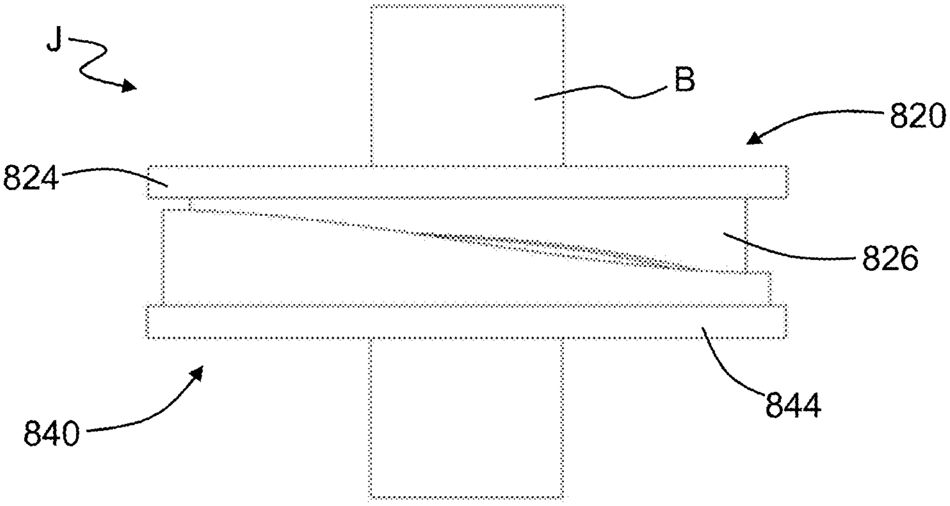
FIG. 19 is a side view of an eighth variant of a rotor and stator of a damper forming part of a steering assembly for a steer-by-wire vehicle in accordance with the present disclosure when a steering column is in a straight ahead position.

FIG. 19 illustrates a damper J according to a tenth exemplary arrangement of the disclosure showing the steering shaft B is in a straight ahead position. The arrangement of FIG. 19 is similar to the arrangements of FIGS. 4 to 6, wherein like features are denoted by like references incremented by '700'. The damper J according the present exemplary arrangement is configured to be located part-way along a steering shaft B, as described in relation to FIG. 2. However, it will be appreciated that the damper J may alternatively be implemented in an arrangement according to FIG. 3, i.e. at the end of a steering shaft B, with minor modification.

In the present exemplary arrangement, the rotor 820 is circular when viewed along the longitudinal axis of the steering shaft B and has a generally circular base plate 824. As shown more clearly in FIGS. 21 and 22, the rotor 820 has a single annular vane 826 extending around the base plate 824 proximate the periphery thereof. The vane 826 extends substantially perpendicularly from the base plate 824 and has a height that varies along its length. For example, the vane 826 has a high point 826*a* and a low point 826*b* diametrically opposite one another, as shown in FIG. 22. The gradient of the vane 826 varies smoothly between the low point 826*b* and the high point 826*a* from a relatively shallow gradient proximate the low point 826*b* and proximate the high point 826*a* and a steeper gradient therebetween.

Figure 21:
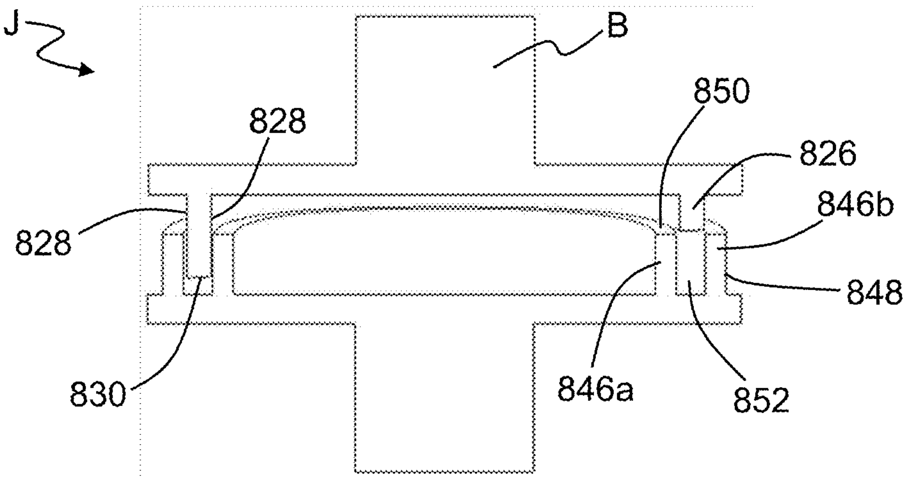
FIG. 21 is a sectional view through the arrangement of FIG. 20.
Figure 22:
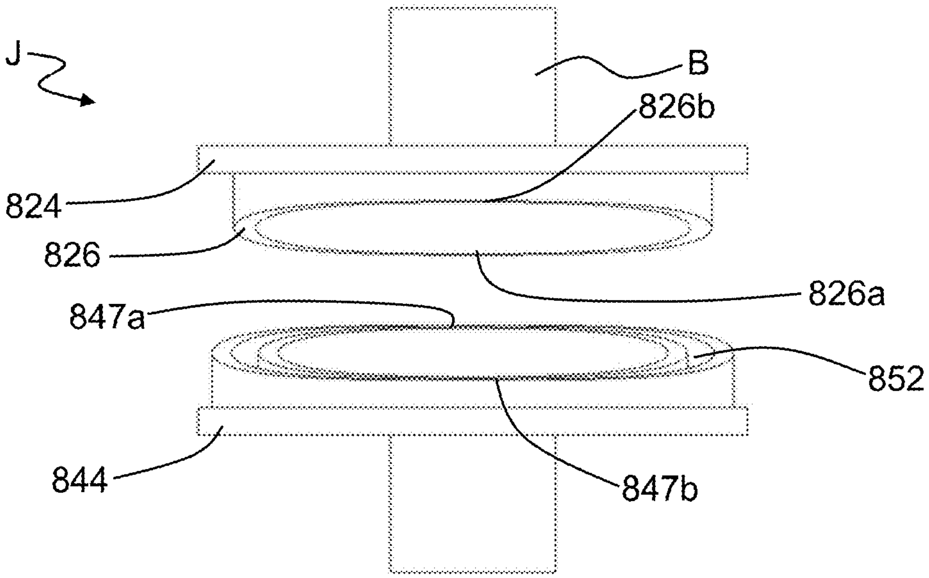
FIG. 22 is an exploded view of the arrangement of FIG. 19 when a steering column is fully rotated clockwise.
Figure 23:
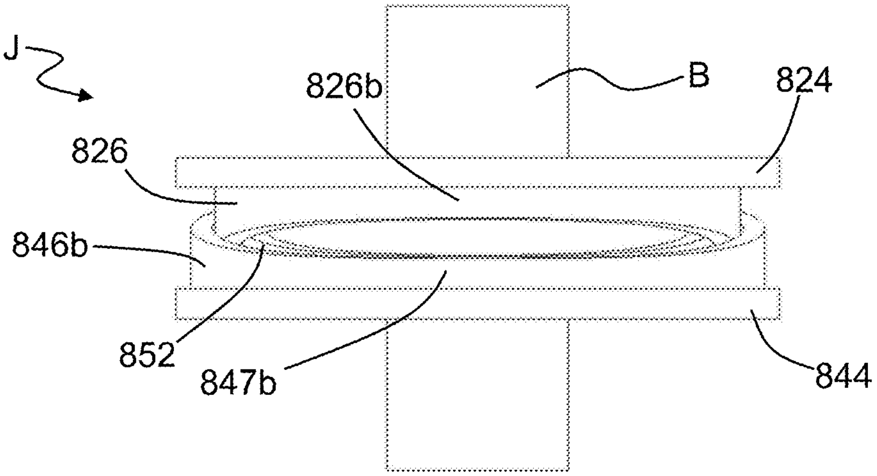
FIG. 23 is a side view of the arrangement of FIG. 19 when a steering column is fully rotated clockwise.
Figure 24:
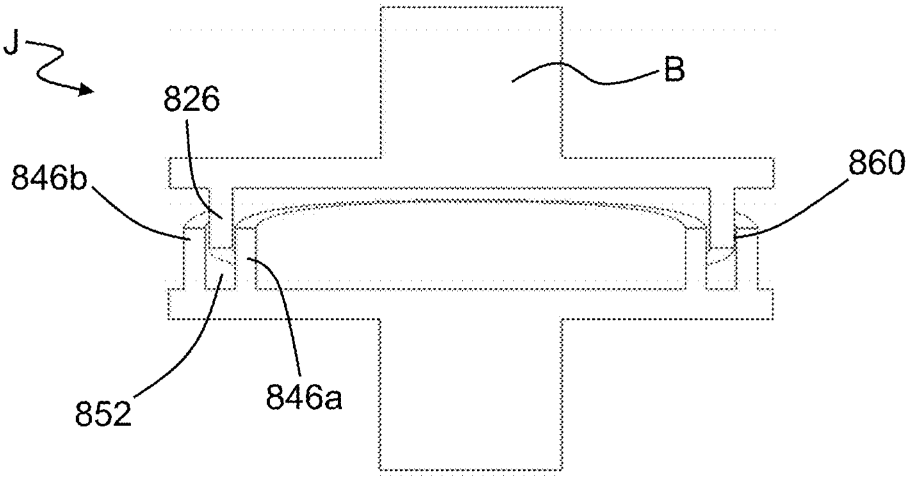
FIG. 24 is a sectional view through the arrangement of FIG. 23.
Figure 25:
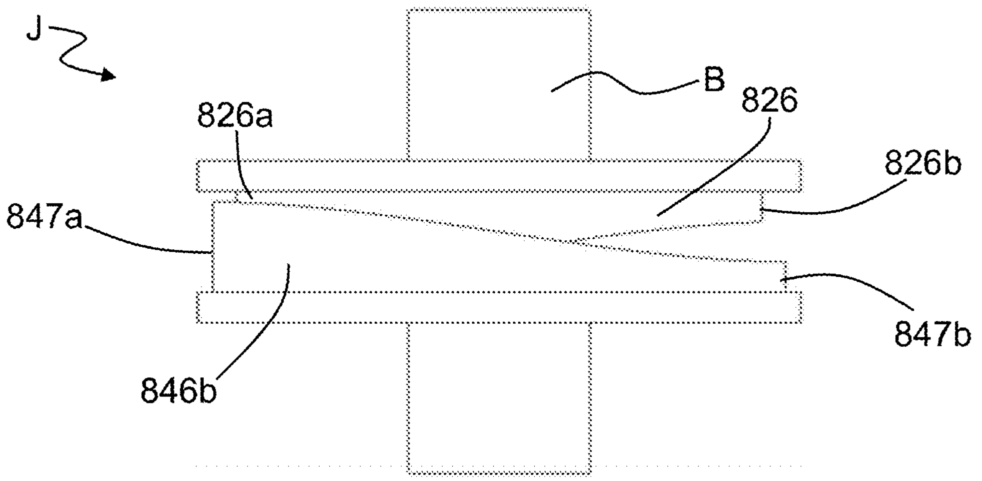
FIG. 25 is a side view of the arrangement of FIG. 23 rotated 90 degrees about its longitudinal axis.

The radially inner and outer side walls of the vane 826 form a pair of annular shear surfaces 828, as shown in FIG. 21. Additionally, the end face of the vane 826 forms a continuous annular shear surface 830.

The stator 840 is also generally circular when viewed along the longitudinal axis of the steering shaft B and has a circular base plate 844. The stator 840 has two annular vanes 846*a*, 846*b* arranged coaxially with the rotational axis of the steering shaft B and extending substantially perpendicularly from the base plate 144. The vanes 846*a*, 846*b* extend parallel with, and are radially offset from, one another so as to define an annular passage 852 therebetween. Each vane 846*a*, 846*b* has respective pair of annular shear surfaces 848, including an inner annular shear surface and an outer annular shear surface located radially outward of the inner radial shear surface. Further, the end face of each of the vanes 846*a*, 846*b* also forms a respective continuous annular shear surface 850.

The vanes 846*a*, 846*b* are arranged in a similar manner to the vane 826 of the rotor 820. For example, each of the vanes 846*a*, 846*b* has a height that varies along its length. The vanes 846*a*, 846*b* have a high point 847*a* and a low point 847*b* diametrically opposite one another. The gradients of the vanes 846*a*, 846*b* vary smoothly between the low point 847*b* and the high point 847*a* in a similar manner to vane 826 of the rotor 820.

In the present exemplary arrangement, the rotor 820 and the stator 840 are brought together such that the vane 826 of the rotor 820 is received within the passage 852 of the stator 840. This provides an annular overlap region 860 wherein annular shear surfaces 828 are positioned adjacent annular shear surfaces 848. When the steering shaft B is in the straight ahead position, as shown in FIG. 19, the high point 826*a* of the vane 826 of the rotor 820 is circumferentially aligned with the low point 847*b* of the vanes 846*a*, 846*b* of the stator 840 and the low point 826*b* of the vane 826 is circumferentially aligned with the high point 847*a* of the vanes 846*a*, 846*b* such that the total area of shear surfaces 828, 848 positioned adjacent one another is at a minimum.

Figure 20:
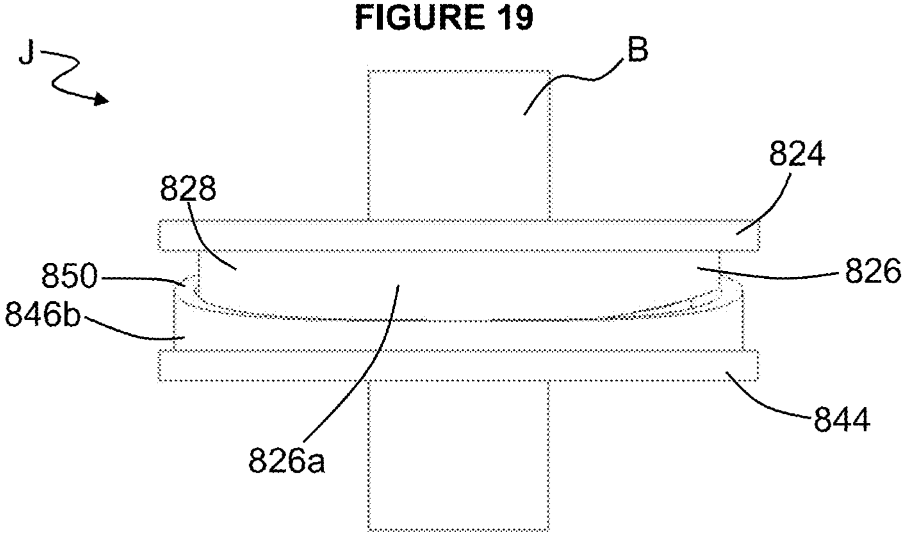
FIG. 20 is a side view of the arrangement of FIG. 19 when a steering column is partially rotated clockwise.

FIGS. 20 and 21 illustrate the damper J of FIG. 19 wherein the steering shaft B is partially rotated in a clockwise direction. The rotor 820, which is rotatable with the steering shaft B, is rotated relative to the stator 840 and the vane 826 is rotated within the passage 832. During this rotation the annular shear surfaces 828, 848 are moved relative to one another. The total area of shear surfaces 828, 848 positioned adjacent one another increases during rotation of the steering shaft B from the straight ahead position of FIG. 19 to the position of FIGS. 20 and 21 as the high point 826*a* of the vane 826 is circumferentially aligned with a point other than the low point 847*b* of each of the vanes 846*a*, 846*b*.

FIGS. 22 to 25 illustrate the damper J of FIG. 19 wherein the steering shaft B is fully rotated in a clockwise direction. In this case, the total area of shear surfaces 828, 848 positioned adjacent one another is at a maximum. In this position the high point 826*a* of the vane 826 is circumferentially aligned with the high point 847*a* of the vanes 846*a*, 846*b*. During rotation of the steering shaft B from the partially rotated position of FIGS. 20 and 21 to the position of FIGS. 22 to 25, the total area of shear surfaces 828, 848 positioned adjacent one another steadily increases.

It will also be appreciated that the described changes in damping will also be experienced when rotating the steering shaft B, and therefore rotor 820, in an anti-clockwise direction from the straight-ahead position of FIG. 19.

Figure 26:
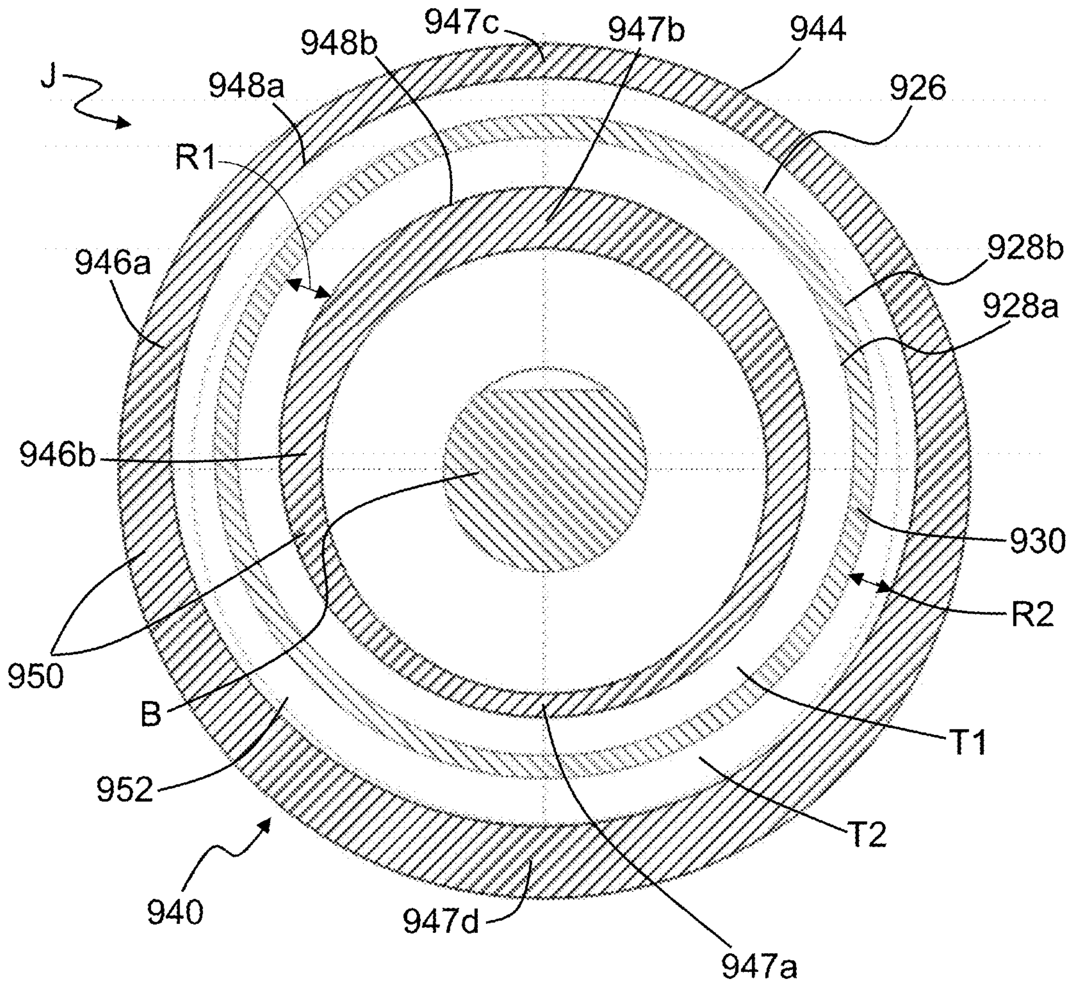
FIG. 26 is a top sectional view of a ninth variant of a rotor and stator of a damper forming part of a steering assembly for a steer-by-wire vehicle in accordance with the present disclosure when a steering column is in a straight ahead position.

FIG. 26 illustrates a damper J according to an eleventh exemplary arrangement of the disclosure wherein the steering shaft B is shown in a straight ahead position. The arrangement of FIG. 26 is similar to the arrangements of FIGS. 19 to 25, wherein like features are denoted by like references incremented by '100'. The damper J according the present arrangement is configured to be positioned at the end of a steering shaft B, as described in relation to FIG. 3. However, it will be appreciated that the damper J may alternatively be implemented in an arrangement according to FIG. 2, i.e. part-way along a steering shaft B, with minor modification.

In the present exemplary arrangement, the rotor (not shown) is generally circular when viewed along the longitudinal axis L of the steering shaft B and has a circular base plate (not shown) that is eccentrically mounted to the steering shaft B and rotatable therewith. The rotor has a single annular vane 926 arranged coaxially with the base plate (and therefore arranged eccentrically with respect to the axis of the steering shaft B) and extending around the base plate proximate the periphery thereof. The vane 926 extends substantially perpendicularly from the base plate and has a pair of annular shear surfaces, namely a radially inner annular shear surface 928*a* and a radially outer annular shear surface 928*b* located radially outward of the radially inner annular shear surface 928*a*. Additionally, the end face of the vane 926 forms a continuous annular shear surface 930.

The stator 940 is also generally circular when viewed along the longitudinal axis L of the steering shaft B and has a circular base plate 944. The stator 940 has two annular vanes 946*a*, 946*b* extending substantially normal from the base plate 944 and arranged coaxially with the rotational axis of the base plate 944 (and therefore arranged eccentrically with respect to the axis of the steering shaft B). Further, the vanes 946*a*, 946*b* extend parallel with and are radially offset from one another so as to define an annular passage 952 therebetween. The centre of the annular passage 952 is offset with respect to the rotational axis of the steering shaft B, as will be explained. The inner face of the outer vane 946*a* forms a radially outer annular shear surface 948*a* and the outer face of the inner vane 946*b* forms a radially inner annular shear surface 948*b*. The annular shear surfaces 948*a*, 948*b* are opposed to and face one another and define the passage 952 between them. Each of the vanes 946*a*, 946*b* has a thickness that varies around its periphery. For example, the radially innermost vane 946*b* has a thinnest point 947*a* and a thickest point 947*b* diametrically opposite one another. Likewise, the radially outermost vane 946*a* has a thinnest point 947*c* and a thickest point 947*d* diametrically opposite one another. Further, the thinnest point 947*a* and thickest point 947*d* are circumferentially aligned with one another and the thickest point 947*b* and the thinnest point 947*c* are circumferentially aligned with one another such that a centre point of the annular passage 952 is not coincident with a centre of rotation of the steering shaft B. The end face of each of the vanes 946*a*, 946*b* also forms an annular shear surface 950.

In the present exemplary arrangement, the rotor and the stator 940 are brought together such that the vane 926 of the rotor is received within the passage 952 of the stator 940 and thereby splitting the passage into two annular chambers T1, T2. A first chamber T1 is located radially inwards of a second chamber T2 and each chamber will contain damping fluid V, in use. When the steering shaft B is in the straight-ahead position, the vane 926 of the rotor is coaxial with respect to the annular passage 952 of the stator 940 (i.e. there is a constant spacing from the annular shear surfaces 948*a*, 948*b* of the stator). In that position, the gap R1 defined between the annular shear surfaces 928*a* and 948*b* and the gap R2 defined between the annular shear surfaces 928*b* and 948*a* are each substantially constant around the annular passage 952. In this position, the total area of shear surfaces 928*a*, 928*b*, 948*a*, 948*b* positioned adjacent one another is at a minimum.

Figure 27:
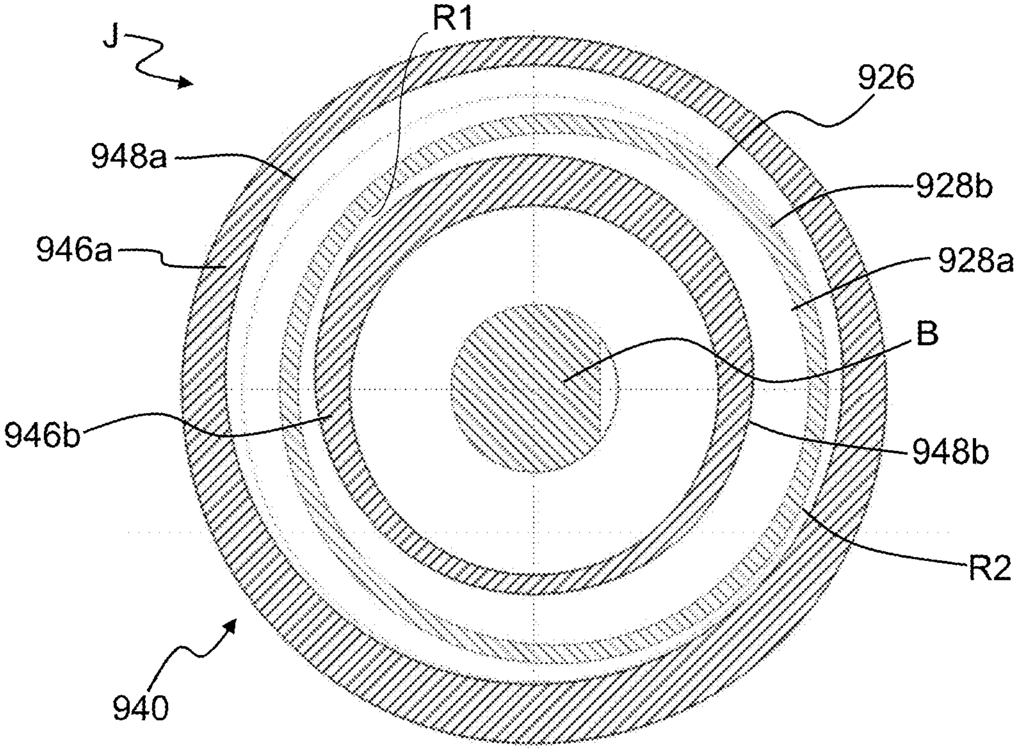
FIG. 27 is a top sectional view of the arrangement of FIG. 26 when a steering column is partially rotated clockwise.

FIG. 27 illustrates the damper J of FIG. 26 wherein the steering shaft B is partially rotated in a clockwise direction. Due to the eccentrically mounted rotor, which is rotatable with the steering shaft B, the vane 926 of the rotor both rotates and translates relative to the stator 940 and the stator vanes 946*a*, 946*b*. In particular, the radially inner annular shear surface 928*a* of the rotor translates towards the radially inner annular shear surface 948*b* of the radially innermost vane 946*b* on one side, and at a diametrically opposite side the radially inner annular shear surface 928*a* of the rotor translates away from the radially inner annular shear surface 948*b* of the radially innermost vane 946*b*. Furthermore, the radially outer annular shear surface 928*b* of the rotor translates towards the radially outer annular shear surface 948*a* of the radially outermost vane 946*a*, and at a diametrically opposite side the radially outer annular shear surface 928*b* translates away from the radially outer annular shear surface 948*a*. The effect is that the gaps R1, R2 are reduced and the total area of shear surfaces 928*a*, 928*b*, 948*a*, 948*b* positioned adjacent one another is increased.

Figure 28:
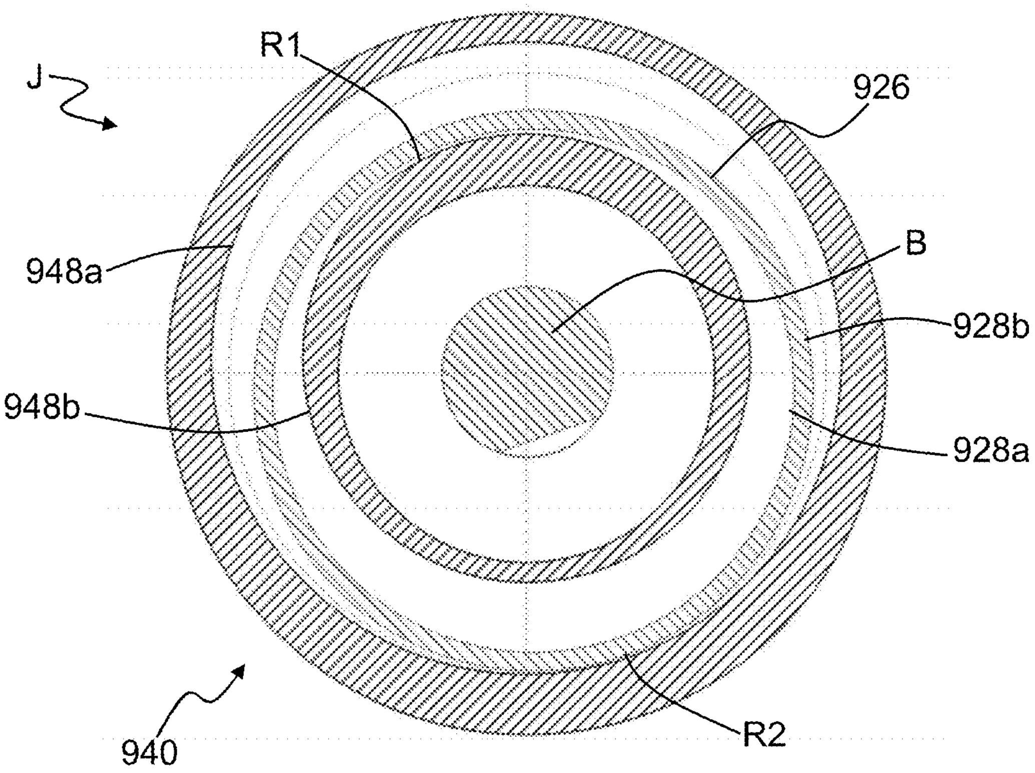
FIG. 28 is a top sectional view of the arrangement of FIG. 26 when a steering column is fully rotated clockwise.

FIG. 28 illustrates the damper J of FIG. 26 wherein the steering shaft B is fully rotated in a clockwise direction. In this case, the total area of shear surfaces 928*a*, 928*b*, 948*a*, 948*b* positioned adjacent one another is at a maximum such that the shearing effect of the damping fluid V between the shear surfaces 928*a*, 928*b*, 948*a*, 948*b* is maximised.

It will be appreciated that during rotation of the steering shaft B from the partially rotated position of FIG. 27 to the position of FIG. 28, the total area of shear surfaces 928*a*, 928*b*, 948*a*, 948*b* positioned adjacent one another steadily increases and the minimum distance of each of the gaps R1, R2 is steadily reduced. This has the result that damping steadily increases. It will be appreciated that the damper J and gaps R1, R2 are presented schematically in order to emphasise the changes with rotation of the steering shaft B, and in practice the gaps R1, R2 and their variation may be smaller in relation to the overall diameter of the rotor and/or stator.

Figure 29:
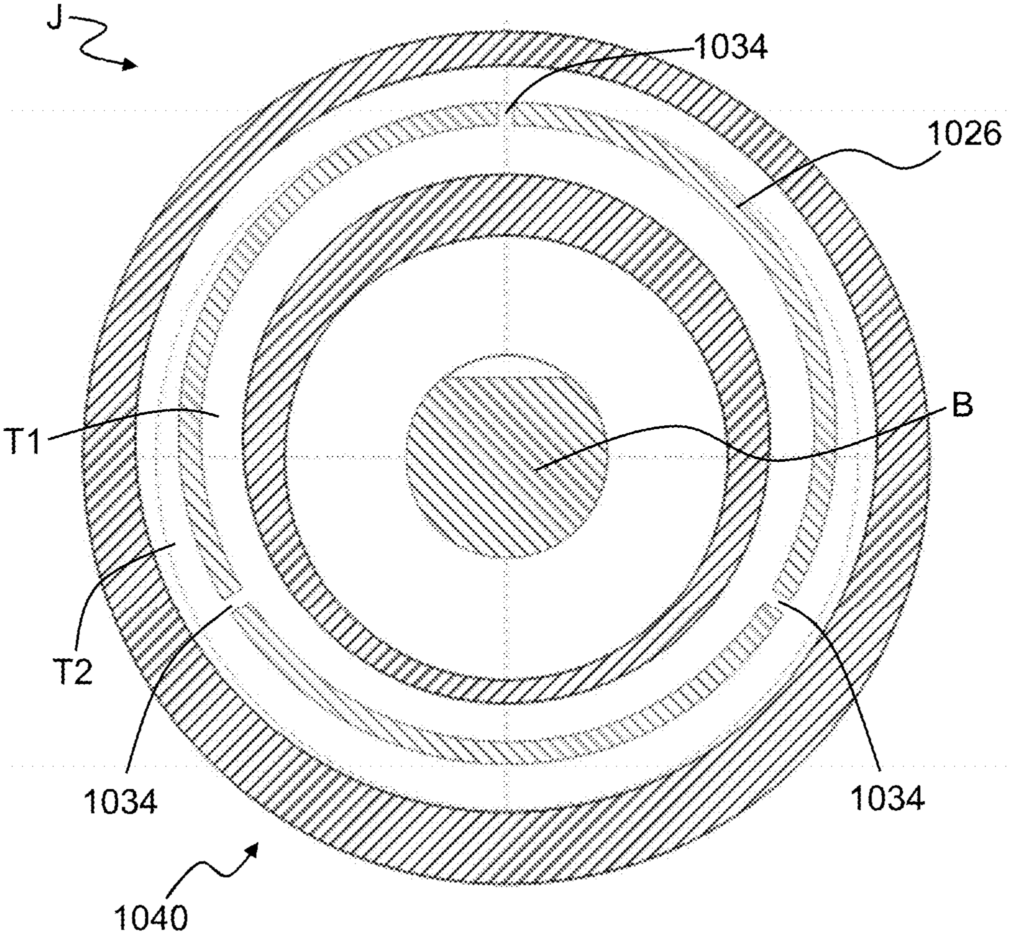
FIG. 29 is a top view of a tenth variant of a rotor and stator of a damper forming part of a steering assembly for a steer-by-wire vehicle in accordance with the present disclosure when a steering column is in a straight ahead position.

FIG. 29 illustrates a damper J according to a twelfth exemplary arrangement of the disclosure wherein the steering shaft B is shown in a straight ahead position. The arrangement of FIG. 29 is similar to the arrangement of FIGS. 26 to 28, wherein like features are denoted by like references incremented by '100'.

The arrangement of FIG. 29 differs from that of FIGS. 26 to 28 in that the vane 1026 of the rotor (not shown) includes three slots 1034 in order to provide fluid communication across the vane 1026 and between the two annular chambers T1, T2. The slots are evenly circumferentially spaced around the vane 1026 and allow damping fluid V to be moved and distributed between the annular chambers T1, T2 as the rotor is moved relative to the stator 1040. The movement of damping fluid V can be used to adjust or tailor the damping and/or feedback torque provided to the steering shaft B.

Figure 30:
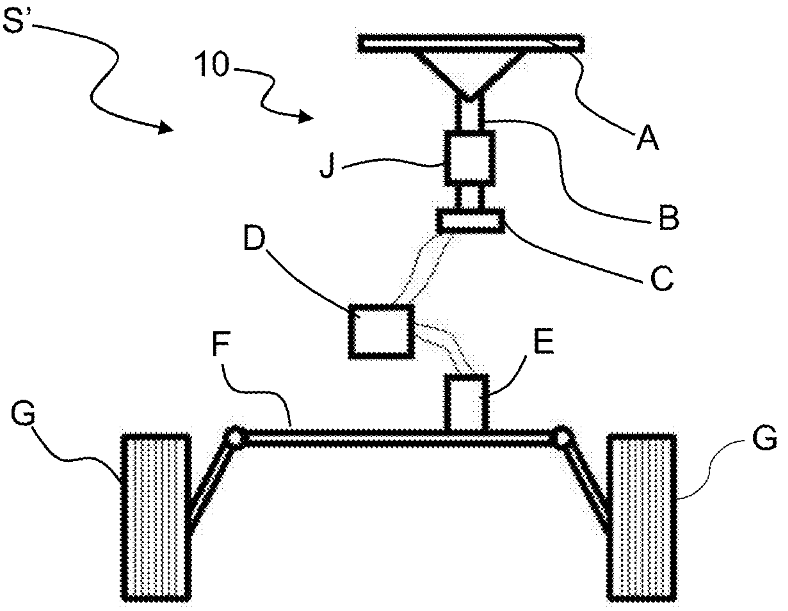
FIG. 30 is a schematic illustration of a further variant of a steer-by-wire steering system in accordance with the present disclosure.

FIG. 30 illustrates an alternative exemplary arrangement of a steer-by-wire system S for a vehicle incorporating a steering assembly 10 in accordance with the present disclosure. The steer-by-wire system S' is similar to the steer-by-wire system S, and like features are denoted by like references. The steer-by-wire system S' of FIG. 30 differs from the steer-by-wire system S of FIG. 1 in that in the present arrangement there is no torque feedback motor H. Instead, the feedback torque provided to the steering wheel A is provided via the damper J. It will be appreciated that any of the dampers J disclosed in FIGS. 2 to 29, described above, may be incorporated into a steering assembly 10 according to FIG. 30, i.e. in the absence of a torque feedback motor H.

It will be appreciated by those skilled in the art that several variations to the aforementioned exemplary arrangements are envisaged without departing from the scope of the disclosure.

It will also be appreciated by those skilled in the art that any number of combinations of the aforementioned features and/or those shown in the appended drawings provide clear advantages over the prior art and are therefore within the scope of the disclosure described herein.

The invention claimed is:

1. A steering assembly for a steer-by-wire vehicle, comprising:

a rotatably mounted elongate steering column configured for attachment of a steering member at one end, the steering column being rotatable about its longitudinal axis in either direction from a straight-ahead position;

a damper comprising:

a housing defining a volume for receipt of a damping fluid;

a stator within the housing and rotatably fixed relative to the housing; and a rotor within the housing, the rotor being coupled with the steering column and rotatable therewith;

wherein each of the stator and rotor comprises a shear surface, the shear surfaces of the stator and the rotor being positioned adjacent one another to generate a resistance to rotation of the rotor when the housing contains damping fluid; and wherein a total surface area of the shear surfaces of the stator and the rotor positioned adjacent one another, which generates the resistance to rotation of the rotor, varies as the steering column is rotated from the straight-ahead position.

2. The steering assembly according to claim 1, wherein the total surface area of the shear surfaces of the stator and the rotor positioned adjacent one another is increased or decreased as the steering column is rotated from the straight-ahead position.

3. The steering assembly according to claim 2, wherein the stator and rotor comprise a plurality of radially spaced elongate projections and one or more passages described between adjacent elongate projections, wherein an elongate projection of the rotor is configured to be received within a passage of the stator and an elongate projection of the stator is configured to be received within a passage of the rotor.

4. The steering assembly according to claim 3, wherein and the rotor and stator are each configured such that an extent to which the elongate projection of the rotor and the elongate projection of the stator are received within the respective passages is increased when the steering column is rotated from the straight-ahead position.

5. The steering assembly according to claim 3, wherein each of the passages has a width greater than a width of the elongate projection configured to be received therein such that adjacent shear surfaces are spaced from one another.

6. The steering assembly according to claim 2, wherein the stator and rotor each comprise a respective elongate projection extending therefrom, and wherein each elongate projection comprises the respective shear surface and wherein the stator and the rotor are configured such that the spacing between the shear surface of the elongate projection of the stator and the shear surface of the elongate projection of the rotor varies as the steering column is rotated from the straight-ahead position.

7. The steering assembly according to claim 6, wherein the spacing is reduced as the steering column is rotated from the straight-ahead position.

8. The steering assembly according to claim 1, wherein the stator and rotor each comprise a respective elongate projection extending therefrom, and wherein each elongate projection comprises the respective shear surface.

9. The steering assembly according to claim 8 wherein the elongate projections extend from the rotor and stator in the direction of the longitudinal axis of the steering column.

10. The steering assembly according to claim 8, wherein each elongate projection is arcuate and at least one shear surface of each elongate projection comprises a part-annular shear surface.

11. The steering assembly according to claim 8, wherein the stator and rotor are each configured such that the elongate projections overlap when viewed along the longitudinal axis of the steering column as the steering column is rotated from the straight-ahead position.

12. The steering assembly according to claim 8, wherein a height of an elongate projection of the rotor or stator varies along its length.

13. The steering assembly according to claim 12, wherein the elongate projection is annular, having a high point of maximum height and low point of minimum height at diametrically opposite locations.

14. The steering assembly according to claim 8, wherein one, or each, elongate projection comprises a slot to allow for the transfer of damping fluid thereacross.

15. The steering assembly according to claim 1, wherein the shear surface of each of the stator and rotor are planar.

16. The steering assembly according to claim 15, wherein shear surface of each of each of the stator and rotor extend radially with respect to the steering column.

17. The steering assembly according to claim 15, wherein the shear surface of the stator is spaced from the shear surface of the rotor along the longitudinal axis of the steering column.

18. The steering assembly according to claim 15, wherein the shear surfaces overlap when viewed along the longitudinal axis of the steering assembly.

19. The steering assembly according to claim 15, wherein each of the shear surfaces is part-annular.

20. The steering assembly according to claim 15, wherein the shear surface of the rotor or stator is annular and the shear surface of the stator or rotor is part-annular.

21. The steering assembly according to claim 20, wherein stator and rotor are configured such that the extent to which the shear surfaces overlap when viewed along the longitudinal axis of the assembly increases as the steering column is rotated from the straight-ahead position.

22. The steering assembly according to claim 1, wherein the rotor is mounted eccentrically.

23. The steering assembly according to claim 1, wherein the steering column is configured to rotate a maximum of a half turn in either direction from the straight ahead position.

24. The steering assembly according to claim 1, wherein adjacent shear surfaces are positioned such that they are coupled via the damping fluid.

25. The steering assembly according to claim 1, comprising a motor configured to provide feedback torque to the steering member.

26. A steering assembly for a steer-by-wire vehicle, comprising:

a rotatably mounted elongate steering column configured for attachment of a steering member at one end, the steering column being rotatable about its longitudinal axis in either direction from a straight-ahead position;

a damper comprising:

a housing defining a volume for receipt of a damping fluid;

a stator within the housing and rotatably fixed relative to the housing; and a rotor within the housing, the rotor being eccentrically coupled with the steering column and rotatable therewith;

wherein each of the stator and rotor comprises a shear surface, the shear surfaces of the stator and rotor being positioned adjacent to one another to generate a resistance to rotation of the rotor when the housing contains damping fluid;

the elongate projection is annular, having a high point of maximum height and low point of minimum height at diametrically opposite locations; and that spacing between the shear surfaces of the stator and rotor, which generates resistance to rotation of the rotor, varies as the steering column is rotated from the straight-ahead position.

27. The steering assembly according to claim 26, wherein the spacing between the shear surfaces of the stator and rotor which generates resistance to rotation of the rotor is reduced as the steering column is rotated from the straight-ahead position.

28. A steering assembly for a steer-by-wire vehicle, comprising:

a rotatably mounted elongate steering column configured for attachment of a steering member at one end, the steering column being rotatable about its longitudinal axis in either direction from a straight-ahead position;

a damper comprising:

a housing defining a volume for receipt of a damping fluid;

a stator within the housing and rotatably fixed relative to the housing; and a rotor within the housing, the rotor being coupled with the steering column and rotatable therewith;

wherein each of the stator and rotor comprises a shear surface, the shear surfaces of the stator and the rotor being positioned adjacent one another to generate a resistance to rotation of the rotor when the housing contains damping fluid;

wherein the stator and rotor each comprise a respective elongate projection extending therefrom, and wherein each elongate projection comprises the respective shear surface, and wherein a height of the elongate projection of the rotor or stator varies along its length;

wherein the stator and rotor are configured such that the high point of the elongate projection of the stator is circumferentially aligned with the low point of the elongate projection of the rotor when the steering column is in a straight-ahead position wherein each of the elongate projections is annular, having a high point of maximum height and low point of minimum height at diametrically opposite locations; and wherein a total surface area of the shear surfaces of the stator and the rotor positioned adjacent one another which generates the resistance to rotation of the rotor, varies as the steering column is rotated from the straight-ahead position.

29. A steering column assembly, comprising:

a rotatably mounted elongate steering column, a steering member mounted to the steering column at one end of the steering column, wherein the steering column is rotatable about its longitudinal axis in either direction from a straight-ahead position; and a damper comprising:

a housing defining a volume for receipt of a damping fluid;

a stator within the housing and rotatably fixed relative to the housing; and a rotor within the housing, wherein the rotor is coupled with the steering column and rotatable therewith;

wherein each of the stator and rotor comprises a shear surface, the shear surfaces of the stator and the rotor being positioned adjacent one another to generate a resistance to rotation of the rotor when the housing contains damping fluid; and wherein a total surface area of the shear surfaces of the stator and the rotor positioned adjacent one another, which generates the resistance to rotation of the rotor, is configured to vary as the steering column is rotated from the straight-ahead position.

30. A vehicle that includes a steering assembly comprising:

a rotatably mounted elongate steering column, a steering member mounted to the steering column at one end of the steering column, wherein the steering column is rotatable about its longitudinal axis in either direction from a straight-ahead position; and a damper comprising:

a housing defining a volume for receipt of a damping fluid;

a stator within the housing and rotatably fixed relative to the housing; and a rotor within the housing, wherein the rotor is coupled with the steering column and rotatable therewith;

wherein each of the stator and rotor comprises a shear surface, the shear surfaces of the stator and the rotor being positioned adjacent one another to generate a resistance to rotation of the rotor when the housing contains damping fluid; and wherein a total surface area of the shear surfaces of the stator and the rotor positioned adjacent one another, which generates the resistance to rotation of the rotor, is configured to vary as the steering column is rotated from the straight-ahead position.

* * * * *